US009311386B1

(12) United States Patent  
Song et al.

(10) Patent No.: US 9,311,386 B1
(45) Date of Patent: Apr. 12, 2016

(54) CATEGORIZING NETWORK RESOURCES AND EXTRACTING USER INTERESTS FROM NETWORK ACTIVITY

(71) Applicant: Narus, Inc., Sunnyvale, CA (US)

(72) Inventors: Han See Song, San Jose, CA (US); Mario Baldi, Cuneo (IT); Qiang Ma, Piscataway, NJ (US); Antonio Nucci, San Jose, CA (US)

(73) Assignee: Narus, Inc., Sunnyvale, CA (US)

( * ) Notice: Subject to any disclaimer, the term of this patent is extended or adjusted under 35 U.S.C. 154(b) by 333 days.

(21) Appl. No.: 13/855,872

(22) Filed: Apr. 3, 2013

(51) Int. Cl.  
*G06F 17/30* (2006.01)

(52) U.S. Cl.  
CPC .... *G06F 17/30598* (2013.01); *G06F 17/30643* (2013.01); *G06F 17/30707* (2013.01); *G06F 17/30722* (2013.01)

(58) Field of Classification Search  
CPC .................................. G06F 17/30643  
USPC .................................. 707/740, 738  
See application file for complete search history.

(56) References Cited

U.S. PATENT DOCUMENTS

| | | | |
|---|---|---|---|
| 8,229,957 B2 * | 7/2012 | Gehrking .......... | G06F 17/30707 707/737 |
| 8,645,384 B1 * | 2/2014 | Juang ................ | G06F 17/30722 707/738 |
| 2003/0225763 A1 * | 12/2003 | Guilak .............. | G06F 17/30707 707/7 |
| 2011/0282858 A1 * | 11/2011 | Karidi .............. | G06F 17/30707 707/709 |
| 2014/0279774 A1 * | 9/2014 | Wang ................ | G06N 3/02 706/20 |

OTHER PUBLICATIONS

Calado, P., et al., "Combining Link-Based and Content-Based Methods for Web Document Classification", In Proceedings of the 12th International Conference on Information and Knowledge Management, pp. 394-401. ACM, 2003.

Koller, D., "Hierarchically classifying documents using very few words", In Proceedings of the 14th International Conference on Machine Learning, pp. 170-178. ACM, 1997.

(Continued)

*Primary Examiner* — Apu Mofiz  
*Assistant Examiner* — Chelcie Daye  
(74) *Attorney, Agent, or Firm* — Kwan & Olynick LLP

(57) ABSTRACT

A method for network resource classification and identifying user interests based on the classification. The method uses a provided hierarchy of categories for classifying network resources, wherein each category is assigned a text item describing the category and the method includes obtaining resource description data collections corresponding to the network resources, and generating, using a semantic correlation algorithm, a category score vector of a network resource by comparing the resource description data collection to the text item assigned to each category in the hierarchy of categories, wherein the category score vector comprises a category score for each category in the hierarchy of categories, wherein the category score is determined based on at least a semantic correlation measure between the resource description data collection and the text item assigned to a corresponding category, wherein the plurality of network resources are classified based at least on the category score.

27 Claims, 14 Drawing Sheets

(56) References Cited

OTHER PUBLICATIONS

Cimiano, P., "Learning Concept Hierarchies from Text Corpora Using Formal Concept Analysis", In Journal of Artificial Intelligence Research, vol. 24 Issue 1, Jul. 2005, pp. 305-339. AI Access Foundation, 2005.

Zhang, X., "Ontology Summarization Based on RDF Sentence Graph", In Proceedings of the 16th international Conference on World Wide Web, pp. 707-716, ACM, 2007.

* cited by examiner

CATEGORIZING NETWORK RESOURCES AND EXTRACTING USER INTERESTS FROM NETWORK ACTIVITY

BACKGROUND OF THE INVENTION

As of September 2012, about 85% of American adults own a cell phone, with over half of them owning a smartphone. For the years of 2011 and 2012, the smartphone ownership increased dramatically. One difference between the smartphone and the traditional cell phone is the ability to download and use mobile applications (commonly referred to as apps) that match various interests of individual owners. As a result, the mobile apps market also experienced an explosive growth. The number of apps exceeded one million with significant (e.g., 20% or more) annual increase of apps in major online apps markets. With an average of 50 apps installed on each smartphone and a daily average of 1.4 hours spent on using the apps, the mobile apps and the app markets have become a significant part of people's daily lives.

SUMMARY

In general, in one aspect, the invention relates to a method for network resource classification. The method includes obtaining a hierarchy of categories for classifying a plurality of network resources, where each category is assigned a text item describing the category, obtaining a plurality of resource description data collections corresponding to the plurality of network resources, wherein the plurality of resource description data collections comprise a first resource description data collection corresponding to a first network resource of the plurality of network resources, and generating, by a computer processor and using a semantic correlation algorithm, a first category score vector of the first network resource by comparing the first resource description data collection to the text item assigned to each category in the hierarchy of categories, wherein the first category score vector comprises a category score for each category in the hierarchy of categories, wherein the category score is determined based on at least a semantic correlation measure between the first resource description data collection and the text item assigned to a corresponding category, wherein the plurality of network resources are classified based at least on the category score.

In general, in one aspect, the invention relates to a system for network resource classification. The system includes a computer processor, an inference input module executing on the computer processor and configured to obtain a hierarchy of categories for classifying a plurality of network resources, where each category is assigned a text item describing the category, obtain a plurality of resource description data collections corresponding to the plurality of network resources, wherein the plurality of resource description data collections comprise a first resource description data collection corresponding to a first network resource of the plurality of network resources, a category score generator executing on the computer processor and configured to generate, using a semantic correlation algorithm, a first category score vector of the first network resource by comparing the first resource description data collection to the text item assigned to each category in the hierarchy of categories, wherein the first category score vector comprises a category score for each category in the hierarchy of categories, wherein the category score is determined based on at least a semantic correlation measure between the first resource description data collection and the text item assigned to a corresponding category, and a repository configured to store the plurality of resource description data collections and the relationship graph, wherein the plurality of network resources are classified based at least on the category score.

In general, in one aspect, the invention relates to a non-transitory computer readable medium embodying instructions for network resource classification. The instructions when executed by a processor comprising functionality for obtaining a hierarchy of categories for classifying a plurality of network resources, where each category is assigned a text item describing the category, obtaining a plurality of resource description data collections corresponding to the plurality of network resources, wherein the plurality of resource description data collections comprise a first resource description data collection corresponding to a first network resource of the plurality of network resources, and generating, using a semantic correlation algorithm, a first category score vector of the first network resource by comparing the first resource description data collection to the text item assigned to each category in the hierarchy of categories, wherein the first category score vector comprises a category score for each category in the hierarchy of categories, wherein the category score is determined based on at least a semantic correlation measure between the first resource description data collection and the text item assigned to a corresponding category, wherein the plurality of network resources are classified based at least on the category score.

Other aspects and advantages of the invention will be apparent from the following description and the appended claims.

DETAILED DESCRIPTION

Figure 1A:
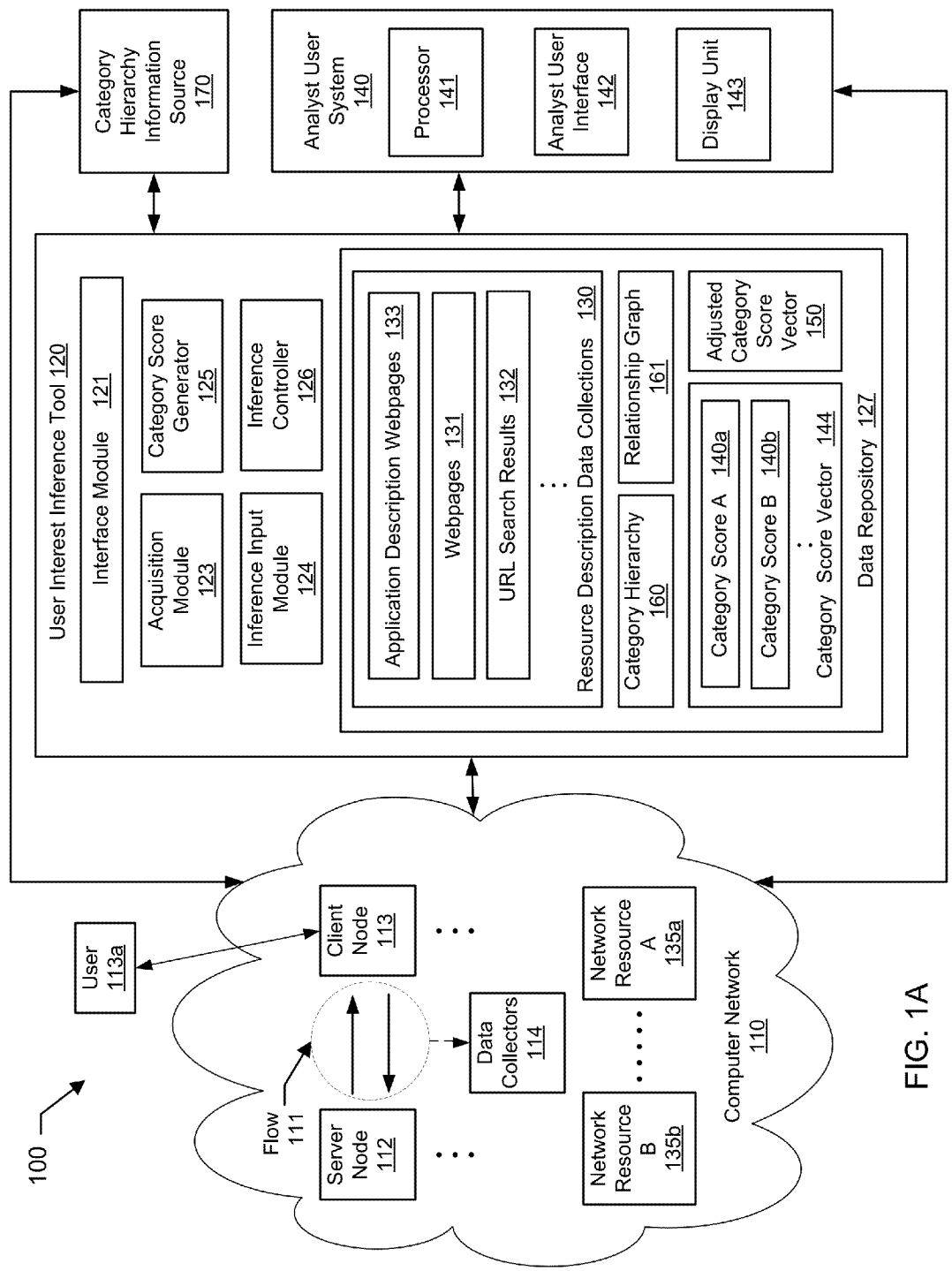
FIGS. 1A-1B show a system block diagram according to aspects of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

Throughout this disclosure, the term "flow" refers to a sequence of packets exchanged between two network nodes, referred to as a source and a destination of the flow where the source or the destination may be the originator of the exchange. Generally, in an IP network, such as the Internet, a flow is identified by a 5-tuple of <source IP address, destination IP address, source port, destination port, protocol> where the payload of the flow may be represented by a string of alphanumeric characters and other sequences of bits.

In one or more embodiments, the term "network resource" refers to one or more of a network client application (e.g., mobile application or app), a webpage, and a network server. In addition, the terms "resource description data collection" refers to a collection of textual data describing the network resource.

Embodiments of the invention provide a method, system, and computer readable medium to identify interests of individual users based on observations of the users' network activity. In one or more embodiments, network applications, webpages, and/or network servers accessed by a user are classified in a user-specific manner into categories that can be mapped onto the interest(s) of the user. In particular, the same network resource may be classified into different categories for different users depending on each user's overall network activity. For example, given a category hierarchy (e.g., operator-defined or provided by a third party information source) and a list (e.g., 2application titles or identifiers, web service names, and/or network server names or addresses) of network resources accessed by a user, each of these user accessed network resources is categorized using the category hierarchy based on relationships found in all these user accessed network resources.

Generally, user specific mapping of a network resource to a category hierarchy relies on information describing user accessed features of the network resource. Given that the name or identifier (e.g., application titles, web service names, and/or network server names) of the network resource alone may not provide sufficient information on its features, in particular the features specifically accessed by the user, additional information are required. For mobile apps, for example, app descriptions are available on the app market of the corresponding operating system (e.g., Google© Play Market or Apple© App Store©). However, such descriptions may not always be available for all the apps. A large proportion of apps descriptions are too brief or simply omitted, rendering the task of extracting useful app features nearly impossible. For web services, although public categorization services are available to find information describing them, such information suffers similar problems as information from the mobile app markets. The webpages generally provide description information, but extracting what is user's specific focus may not be trivial.

Even for the scenario where network resource descriptions are informative, they are still limited to the wordings used by the author, e.g., app developers. For example, a network feature based category hierarchy uses networking terms, while descriptions of financial service apps use economic terms. The mapping between financial service app descriptions and network feature based category hierarchy is therefore not straightforward. Further, some category hierarchy may have extensive sub-categories, and others may not. For example in the categorization used by the Google© Play Market, only the game category has two level sub-categories, while the other 26 categories don't have any sub-categorization. Even for the scenario where extensive sub-categories exist in the category hierarchy, children categories maybe not able to cover all aspects of their parent category and be mutually exclusive of each other. Even when categories are mutually exclusive, proper mapping of categories to features of network resources or to keywords that can be found in the network resources descriptions is not a straightforward task. When network resources accessed by a user are properly categorized, inferring user interests directly from a set of categories is not straightforward. Just using the categories as a list of interests may be too vague and not representative. Moreover, specific interests may be reflected by user accesses to a network resource in a combination of categories instead of a single category.

In one or more embodiments, to address the challenges described above, the disclosure below describes (i) gathering a rich set of network resource features based on the list of their names, (ii) enriching each category in the category hierarchy either automatically using domain specific knowledge or through supervision by domain experts, (iii) performing either supervised or unsupervised classification on the network resources according to the category hierarchy, and (iv) inferring user interests from the category of the network resources accessed by the user, e.g., by summarizing the categories assigned to the user accessed network resources.

FIG. 1A shows a diagram of a system (100) for extracting user interests from network activity in accordance with one or more embodiments. In one or more embodiments of the invention, one or more of the components shown in FIG. 1A may be omitted, repeated, and/or partitioned in a different manner. Accordingly, embodiments of the invention should not be considered limited to the specific arrangements of components shown in FIG. 1A.

As shown in FIG. 1A, the system (100) includes a user interest inference tool (120), a category hierarchy information source (170), a analyst user system (140), and a computer network (110). The user interest inference tool (120) includes data repository (127), one or more application interfaces (121), an acquisition module (123), an inference input module (124), a category score generator (125), and an inference controller (126). The analyst user system (140) includes a processor (141), a analyst user interface (142), and a display unit (143). The computer network (110) may include cellular communications network or other mobile communications network, wired and/or wireless portions of the Internet, wide area networks (WANs), local area networks (LANs), etc.

Further, the computer network (110) includes network nodes (e.g., server node (112), client node (113), data collectors (114), etc.), which are the devices configured with computing and communication capabilities for executing applications in the network (110). As shown in FIG. 1A, the server node (112) and client node (113) communicate with each other by exchanging data packets forming a flow (111), which includes two unidirectional flows represented by two arrows. Although shown as a bi-directional flow in the example depicted in FIG. 1A, the flow (111) may also be a single unidirectional flow in other examples. In one or more embodiments, the server node (112) and the client node (113) exchange data packets in the flow (111) as a result of an application executing on the server node (112) and the client node (113). In this context, the flow (111) is referred to as being generated by the application executing on the server node (112) and client node (113). In one or more embodiments, the client node (113) may be a mobile device, such as a smartphone, a tablet computer, a hand held gaming device, etc., used by a user (113a) (e.g., an individual). In such embodiments, the application may be referred to as a mobile application, mobile app, or app. In one or more embodiments, certain device(s) (e.g., data collectors (114)) within the computer network (110) may be configured to collect network data (e.g., flow (111)) for providing to the user interest inference tool (120).

Further, the computer network (110) includes network resources (e.g., network resource A (135a), network resource B (135b), etc.). In one or more embodiments, the network resources include network applications, webpages, network servers, etc. For example, the network resource A (135a) may be a mobile application executing on the client node (113) or a webpage hosted on the server node (112). In another example, the network resource B (135b) may be a network server similar to the server node (112).

Each of components shown in FIG. 1A is described below. One of ordinary skill in the art will appreciate that embodiments are not limited to the configuration shown in FIG. 1A.

In one or more embodiments of the invention, the user interest inference tool (120) is configured to interact with the computer network (110) using one or more of the application interface(s) (121). The interface module (121) may be configured to receive data (e.g., flow (111)) from the computer network (110) and/or store received data to the data repository (127). Such network data captured over a time period (e.g., an hour, a day, a week, etc.) is referred to as a trace or network trace. Network trace contains network traffic data related to communications between nodes in the computer network (110). For example, the network trace may be captured on a routine basis using the data collectors (114) and selectively sent to the interface module (121) to be formatted and stored in the repository (127) for analysis. For example, the data collectors (114) may be a packet analyzer, network analyzer, protocol analyzer, sniffer, netflow device, semantic traffic analyzer (STA), or other types of data collection devices that intercept and log data traffic passing over the computer network (110) or a portion thereof. In one or more embodiments, the data collectors (114) may be deployed in the computer network (110) by a network communication service provider (e.g., ISP), a network security service provider, a cellular service provider (CSP) or other business or government entities. The data collector (114) may be configured to capture and provide network trace to the interface module (121) through an automated process, such as through a direct feed or some other form of automated process. Such network data may be captured and provided on a periodic basis (e.g., hourly, daily, weekly, etc.) or based on a trigger. For example, the trigger may be activated automatically in response to an event in the computer network (110) or activated manually through the analyst user system (140). In one or more embodiments, the data collectors (114) are configured and/or activated by the user interest inference tool (120).

In one or more embodiments, the category hierarchy information source (170) is a third party source of category hierarchy information, such as user interest categories for online targeted advertisement from Google© Ads Preferences, large-scale knowledge base from Metaweb Technologies© Freebase, or hierarchical web site ontology from Netscape© Open Directory Project (ODP).

In one or more embodiments, the analyst user system (140) is configured to interact with an analyst user using the analyst user interface (142). The analyst user interface (142) may be configured to receive data and/or instruction(s) from the analyst user. The analyst user interface (142) may also be configured to deliver information (e.g., a report or an alert) to the analyst user. In addition, the analyst user interface (142) may be configured to send data and/or instruction(s) to, and receive data and/or information from, the user interest inference tool (120). The analyst user may include, but is not limited to, an individual, a group, an organization, or some other entity having authority and/or responsibility to access the user interest inference tool (120). Specifically, the context of the term "analyst user" here is distinct from that of a user (e.g., user (113a)) of the computer network (110) or a user (e.g., user (113a)) of the application executing on the sever node (112) and the client node (113). The analyst user system (140) may be, or may contain a form of, an internet-based communication device that is capable of communicating with the interface module (121) of the user interest inference tool (120). Alternatively, the user interest inference tool (120) may be part of the analyst user system (140). The analyst user system (140) may correspond to, but is not limited to, a workstation, a desktop computer, a laptop computer, or other user computing device.

In one or more embodiments, the processor (i.e., central processing unit (CPU)) (141) of the analyst user system (140) is configured to execute instructions to operate the components of the analyst user system (140) (e.g., the analyst user interface (142) and the display unit (143)).

In one or more embodiments, the analyst user system (140) may include a display unit (143). The display unit (143) may be a two dimensional (2D) or a three dimensional (3D) display configured to display information regarding the computer network (e.g., browsing the network traffic data) or to display intermediate and/or final results of the user interest inference tool (120) (e.g., report, alert, etc.), including intermediate and/or final results of the signature set selection process.

As shown, communication links are provided between the user interest inference tool (120), the computer network (110), the category hierarchy information source (170), and the analyst user system (140). A variety of links may be provided to facilitate the flow of data through the system (100). For example, the communication links may provide for continuous, intermittent, one-way, two-way, and/or selective communication throughout the system (100). The communication links may be of any type, including but not limited to wired, wireless, and a sequence of links separated by intermediate systems routing data units. In one or more embodiments, the user interest inference tool (120), the analyst user system (140), the category hierarchy information source (170), and the communication links may be part of the computer network (110).

In one or more embodiments, a central processing unit (CPU, not shown) of the user interest inference tool (120) is configured (e.g., programmed) to execute instructions to operate the components of the user interest inference tool (120). In one or more embodiments, the memory (not shown) of the user interest inference tool (120) is configured to store software instructions for analyzing the network trace to infer user interest. The memory may be one of a variety of memory devices, including but not limited to random access memory (RAM), read-only memory (ROM), cache memory, and flash memory. The memory may be further configured to serve as back-up storage for information stored in the data repository (127).

The user interest inference tool (120) may include one or more system computers, which may be implemented as a server or any conventional computing system having a hardware processor. However, those skilled in the art will appreciate that implementations of various technologies described herein may be practiced in other computer system configurations known to those skilled in the art.

In one or more embodiments, the user interest inference tool (120) is configured to obtain and store data in the data repository (127). In one or more embodiments, the data repository (127) is a persistent storage device (or set of devices) and is configured to receive data from the computer network (110) using the interface module (121). The data repository (127) is also configured to deliver working data to, and receive working data from, the acquisition module (123), inference input module (124), category score generator (125), and inference controller (126). The data repository (127) may be a data store (e.g., a database, a file system, one or more data structures configured in a memory, some other medium for storing data, or any suitable combination thereof), which may include information (e.g., resource description data collections (130), category score vector (144), adjusted category score vector (150), category hierarchy (160), relationship graph (161), etc.) related to inferring user interest. The data repository (127) may be a device internal to the user interest inference tool (120). Alternatively, the data repository (127) may be an external storage device operatively connected to the user interest inference tool (120).

In one or more embodiments, the user interest inference tool (120) is configured to interact with the analyst user system (140) using the interface module (121). The interface module (121) may be configured to receive data and/or instruction(s) from the analyst user system (140). The interface module (121) may also be configured to deliver information and/or instruction(s) to the analyst user system (140). In one or more embodiments, the user interest inference tool (120) is configured to support various data formats provided by the analyst user system (140).

In one or more embodiments, the user interest inference tool (120) includes the acquisition module (123) that is configured to obtain a network trace from the computer network (110), for example via data collectors (114). In one or more embodiments, the acquisition module (123) works in conjunction with the data collectors (114) to parse data packets and collate data packets belonging to the same flow tuple (i.e., the aforementioned 5-tuple) for flow reconstruction and for accumulating multiple flows (e.g., flow (111)) to form the network trace. Although not explicitly shown FIG. 1A, such network trace may be stored in the repository (127).

In one or more embodiments, a flow parser (e.g., acquisition module (123) in conjunction with data collectors (114)) reconstructs (e.g., eliminates redundant packets, collates packets into a correct sequence, etc.) all the packets that correspond to the same traffic flow (e.g., flow (111)) identified by the aforementioned 5-tuple. In one or more embodiments, the flows (e.g., flow (111)) are captured and parsed throughout a pre-configured time interval recurring on a periodic basis (e.g., every minute, hourly, daily, etc.) or triggered in response to an event.

In one or more embodiments of the invention, the user interest inference tool (120) includes the inference input module (124) that is configured to identify network resources (e.g., network resource A (135a), such as a mobile application, webpage, network server, etc.) accessed by a user (e.g., user (113a)) based on one or more flows (e.g., flow (111)) in the network trace. As noted above, the user (113a) may be a mobile user using a smartphone, such as the client node (113) that executes a mobile application or is used to access other network resources. In one or more embodiments, a portion of the network trace is identified as corresponding to network activities of the user (113a). For example, such identification may be based on a known IP address assigned to the client node (113), such as a smartphone of the user (113a). Accordingly, identifiers of mobile application(s) used by the user (113a) and/or other network resources (e.g., webpages, network servers, etc.) accessed by the user (113a) may be extracted from the portion of the network trace that is identified as corresponding to network activities of the user (113a).

Figure 1B:
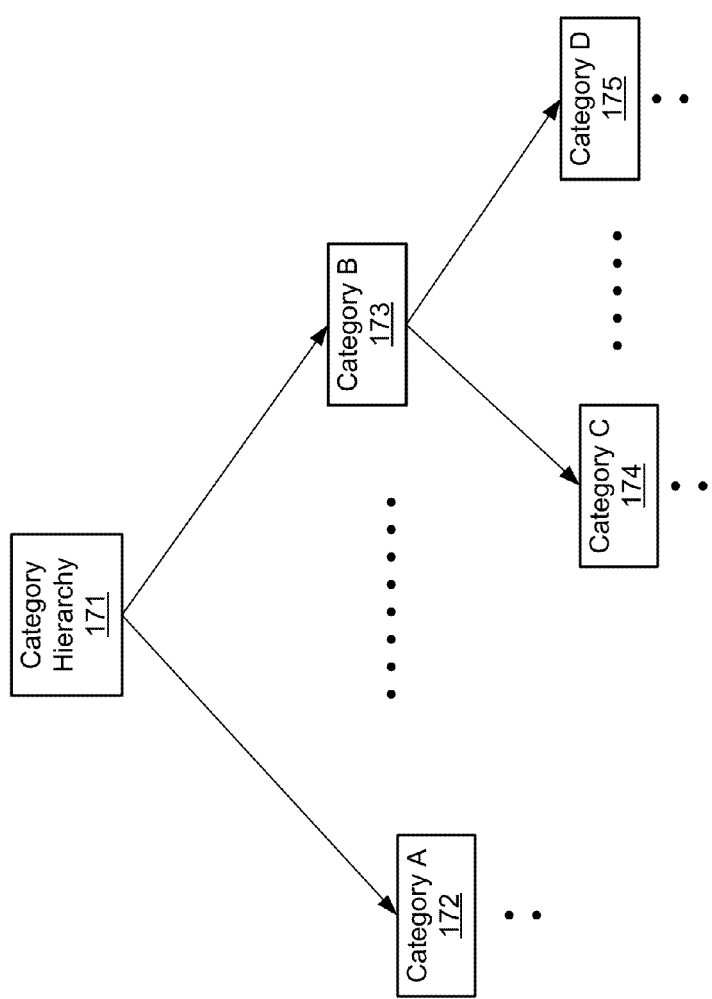
Figure 3A:
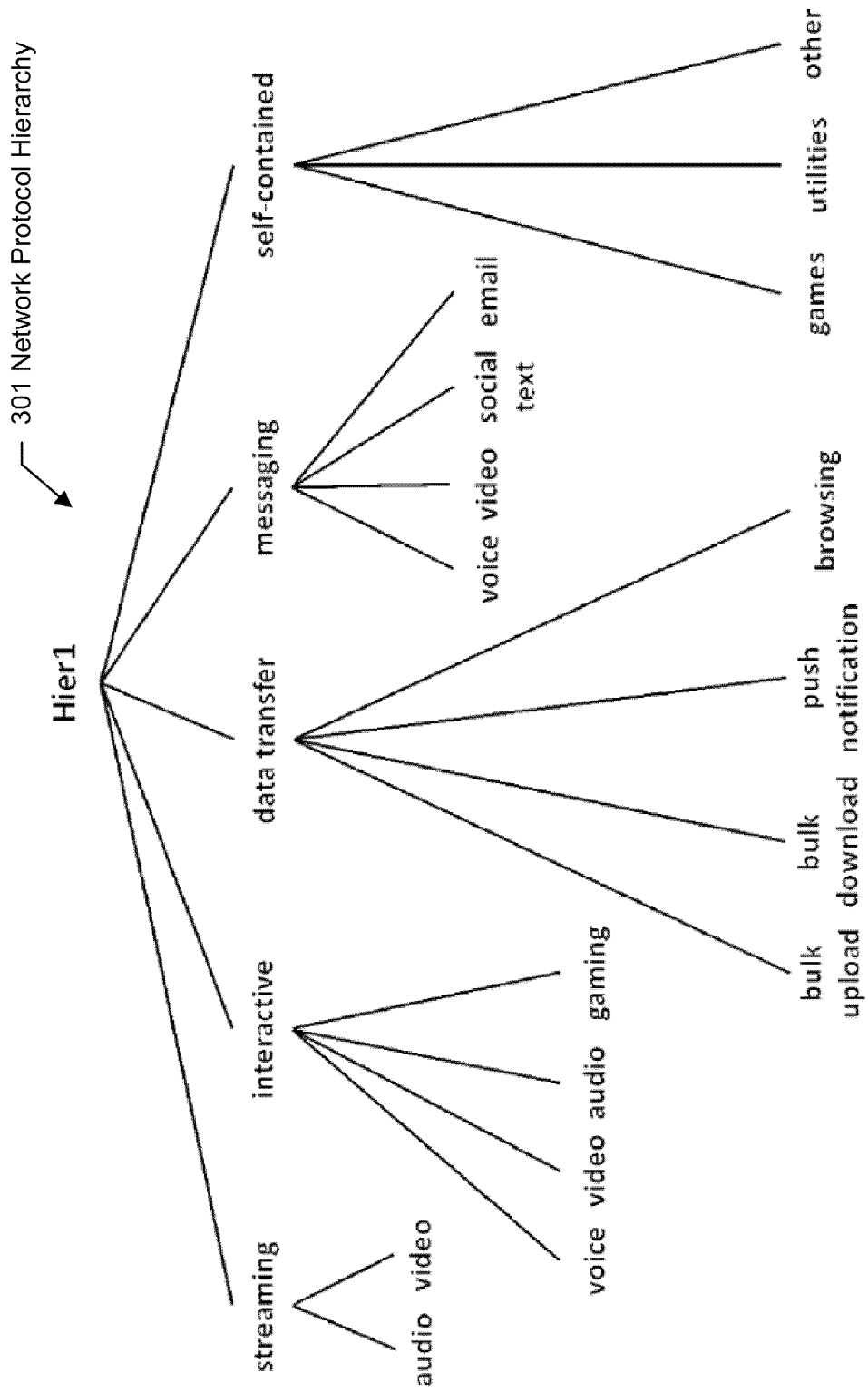
FIGS. 3A-3K show various examples according to aspects of the invention.
Figure 3B:
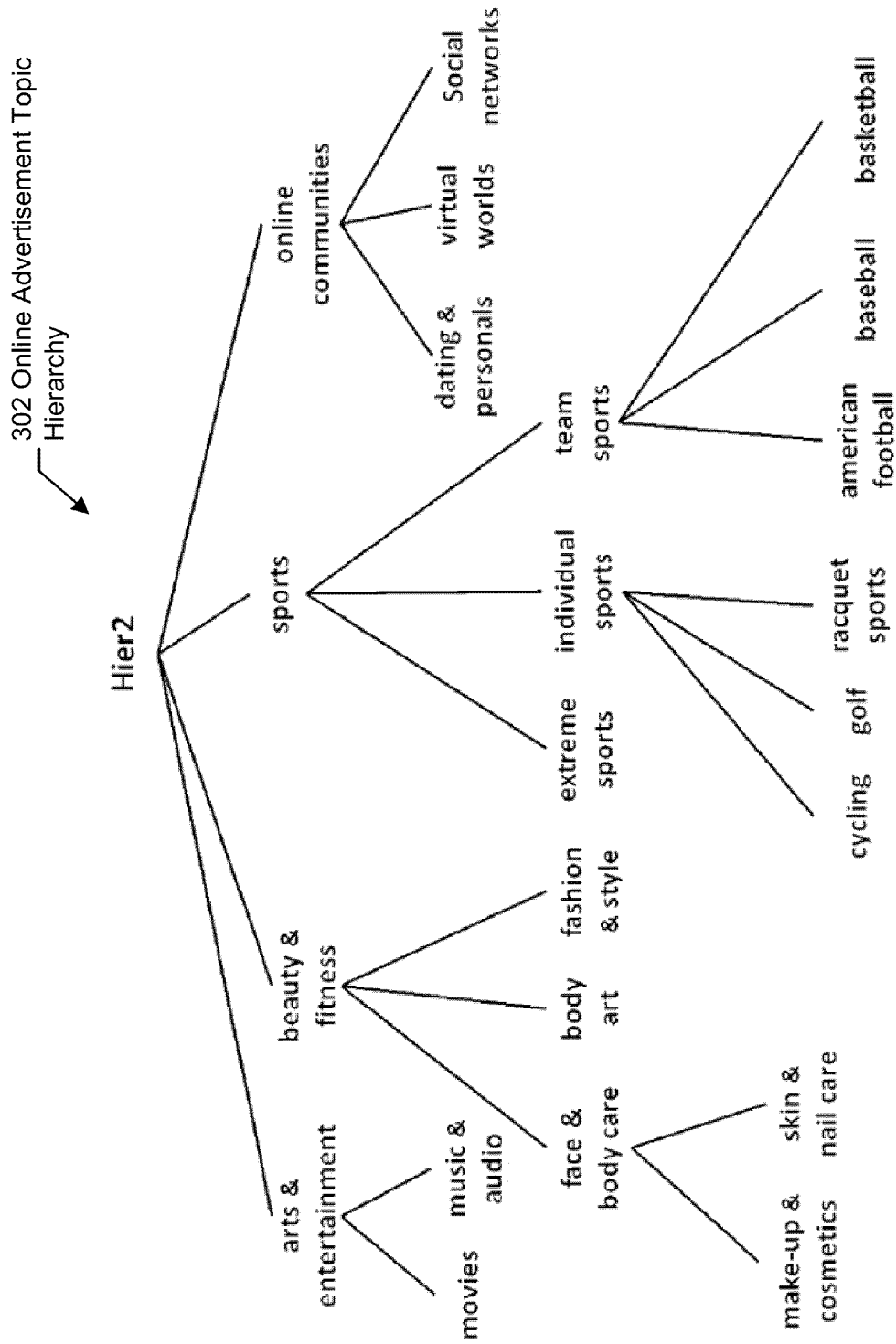
Figure 3C:
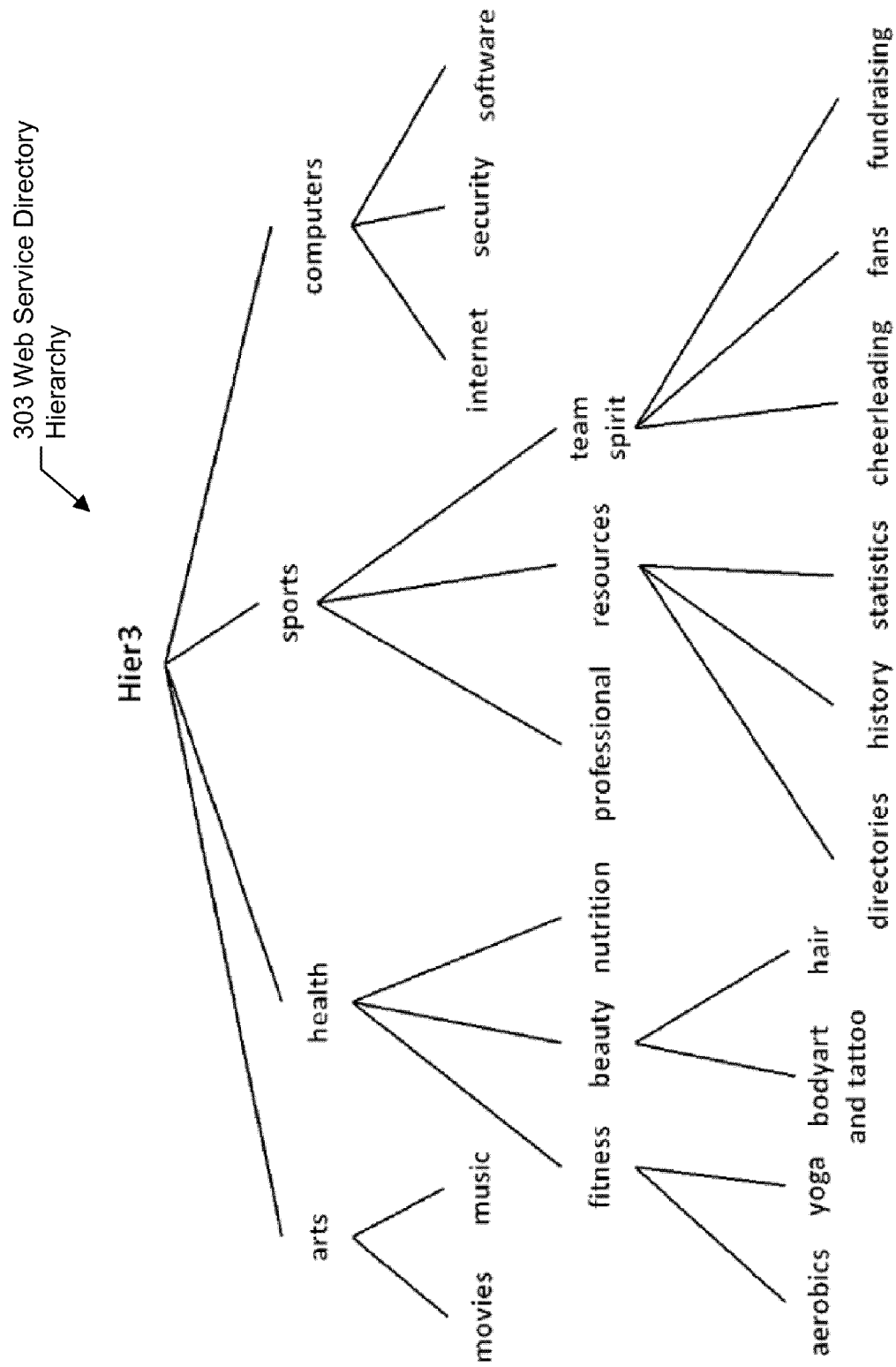

In one or more embodiments, the inference input module (124) is further configured to obtain a hierarchy of categories (referred to as category hierarchy) for classifying the network resources (e.g., mobile applications, webpages, network servers, etc.) accessed by the user (113a). FIG. 1B shows an example category hierarchy (171) in the schematic form. As shown, the category hierarchy (171) includes multiple hierarchical levels having category A (172), category B (173), etc, in the top level, and category C (174), category D (175), etc. as child categories (also referred to as sub-categories) of their parent category B (173). Additional child categories may also exist for any other category in the category hierarchy (171). In one or more embodiments, category hierarchy (171) may not include any child category and instead only include a single level. In one or more embodiments, each category is assigned a text item (i.e., one or more words) describing the category. Generally, the text term assigned to a child category describes a subset of what its parent is described as by the parent's assigned text term. Examples of the category hierarchies with assigned text terms are depicted in FIGS. 3A-3C below.

Returning to the description of FIG. 1A, in one or more embodiments, the inference input module (124) is configured to obtain an operator-defined category hierarchy from the analyst user system (140). For example, the operator-defined category hierarchy may be defined by the aforementioned analyst user operating the analyst user system (140). In one or more embodiments, the inference input module (124) is configured to obtain a third party defined category hierarchy from the category hierarchy information source (170). In one or more embodiments, the operator-defined category hierarchy and/or the third party defined category hierarchy are stored in the data repository (127) as the category hierarchy (160). In one or more embodiments, the operator-defined category hierarchy and/or the third party defined category hierarchy are expanded by inserting additional semantically equivalent descriptions (e.g., by the inference input module (124)) before they are stored in the data repository (127) as the category hierarchy (160).

In one or more embodiments, the inference input module (124) is further configured to obtain the resource description data collections (130) corresponding to the network resources of the compute network (110). Specifically, each resource description data collection includes information describing a corresponding network resource. In one or more embodiments, a portion of the resource description data collections (130) are obtained in response to identifying the network resources accessed by the user (113a). In such embodiments, the portion of the resource description data collections (130) correspond to those network resources that are identified as currently being accessed by the user (113a) or having been accessed by the user (113a). In one or more embodiments, another portion of the resource description data collections (130) are obtained prior to identifying the network resources accessed by the user (113a).

In one or more embodiments, the resource description data collection (130) includes the application description webpages (133). For example, the application description webpages (133) may be obtained based on a network application (e.g., network resource A (135a), such as a mobile app) used by the user (113a). In one or more embodiments, a description webpage hosted by a network application distribution source (e.g., Google© Play Market or Apple© App Store©) to describe the network application is included in the application description webpages (133) as an initial seed. Using the initial seed, the application description webpages (133) are expanded iteratively to include additional description webpages of other network applications. Specifically, each of these other network applications is identified based on being cross referenced (e.g., mentioned in a user review of the description webpage) by (i) the initial seed or (ii) another network application already identified based on the initial seed for expanding the application description webpages (133). In one or more embodiments, the cross referencing relationships of these network applications are captured to form a network application mentioning graph, which is stored in the data repository (127) as part of the relationship graph (161). An example of the network application mentioning graph (370) is shown in FIG. 3G. In one or more embodiments, the application description webpages (133) are iteratively expanded based on the relationship graph (161). In one or more embodiments, the application description webpages (133) are adjusted by adjusting the relationship graph (161). For example, application description webpages (133) and the relationship graph (161) may be adjusted based on an input received from the analyst user system (140). Additional details of obtaining and adjusting the application description webpages (133) are described in reference to FIG. 2 below.

In one or more embodiments, the resource description data collection (130) includes the webpages (131). For example, the webpages (131) may be obtained based on one or more webpages (e.g., network resource A (135a)) accessed by the user (113a). In one or more embodiments, the one or more webpages (e.g., network resource A (135a)) accessed by the user (113a) are included in the webpages (131) as an initial seed. Using the initial seed, the webpages (131) are expanded iteratively to include additional webpages (e.g., network resource B (135b)). Specifically, each of these additional webpages is identified based on being cross referenced (e.g., via a hyperlink) by (i) the initial seed or (ii) another webpage already identified based on the initial seed for expanding the webpages (131). In one or more embodiments, the cross referencing relationships of these webpages are captured to form a web service graph, which is stored in the data repository (127) as part of the relationship graph (161). An example of the web service graph (371) is shown in FIG. 3H. In one or more embodiments, the webpages (131) are iteratively expanded based on the relationship graph (161). In one or more embodiments, the webpages (131) are adjusted by adjusting the relationship graph (161). For example, the webpages (131) and the relationship graph (161) may be adjusted based on an input received from the analyst user system (140). Additional details of obtaining and adjusting the webpages (131) are described in reference to FIG. 2 below.

In one or more embodiments, the resource description data collection (130) includes the URL search results (132). For example, the URL search results (132) may be obtained based on one or more URLs (e.g., identifying the network resource A (135a), etc.) accessed by the user (113a). In one or more embodiments, the one or more URLs (e.g., identifying the network resource A (135a), etc.) accessed by the user (113a) are used as search keywords for a search engine to generate initial search results, which are included in the URL search results (132) as an initial seed. Using the initial seed, the URL search results (132) are expanded iteratively to include additional search results using other URLs (e.g., identifying the network resource B (135b), etc.) as the search keywords. Specifically, each of these other URLs is identified based on IP prefix similarity and/or IP aliases with respect to (i) the initial seed or (ii) another URL already identified based on the initial seed for expanding the URL search results (132). In one or more embodiments, the cross referencing relationships of these URLs are captured to form an IP similarity graph, which is stored in the data repository (127) as part of the relationship graph (161). An example of the IP similarity graph (372) is shown in FIG. 3H. In one or more embodiments, the URL search results (132) are iteratively expanded based on the relationship graph (161). In one or more embodiments, the URL search results (132) are adjusted by adjusting the relationship graph (161). For example, the URL search results (132) and the relationship graph (161) may be adjusted based on an input received from the analyst user system (140). Additional details of obtaining and adjusting the URL search results (132) are described in reference to FIG. 2 below.

In one or more embodiments, the inference input module (124) is further configured to generate, based on a pre-determined criterion, the relationship graph (161). In particular, the relationship graph (161) is user specific and includes nodes representing the network resources (e.g., network resource A (135a), network resource B (135b)) as well as edges representing a measure of cross-references between the resource description data collections corresponding to the network resources. As noted above, the relationship graph (161) is seeded by network resources (e.g., network resource A (135a)) accessed by the user (113a) and iteratively expanded to include additional network resources (e.g., network resource B (135b)) related to (i) the initial seed or (ii) another network resource already identified based on the initial seed for expanding the relationship graph (161). Examples of the relationship graph (161) are described in reference to FIGS. 3G and 3H below.

In one or more embodiments of the invention, the user interest inference tool (120) includes the category score generator (125) that is configured to generate, using a semantic correlation algorithm, a category score vector (144) of a network resource (e.g., network resource A (135a), such as a network application, webpage, or network server accessed by the user (113a)) by comparing the corresponding resource description data collection (e.g., application description webpages (133), webpages (131), or URL search results (132)) to the text item assigned to each category in the category hierarchy (160). As shown in FIG. 1A, the category score vector (144) includes a category score (e.g., category score A (140a), category score B (140b)) for each category in the category hierarchy (160). In particular, the category score (e.g., category score A (140a), category score B (140b)) represents a semantic correlation measure between the resource description data collection and the text item assigned to a corresponding category. Additional details of generating the category score vector of network resources are described in reference to FIG. 2 below.

In one or more embodiments, the category score generator (125) is further configured to adjust, based on the relationship graph (161), the category score vector (144) to generate an adjusted category score vector (150) using at least another category score vector (not shown) of another network resource (e.g., network resource B (135b)). For example, the another network resource B (135b) is identified, based on the relationship graph (161), as related to the network resource A (135a) accessed by the user (113a). In particular, the network resource B (135b) may or may not be accessed by the user (113a).

In one or more embodiments of the invention, the user interest inference tool (120) includes the inference controller (126) that is configured to control the category score generator (125) such that the results (e.g., the category score vector (144) or adjusted category score vector (150)) meets a pre-determined requirement. In one or more embodiments, the inference controller (126) analyzes the category score vector (144) to determine a score differentiation measure representing variations among category scores (e.g., category score A (140a), category score B (140b)) in the category score vector (144). In one or more embodiments, the score differentiation measure is based on a ratio between the highest category score and the second highest category score in the category score vector (144). In other embodiments, other statistical measure may also be used to represent a level of differentiation among all category scores in the category score vector (144).

If the score differentiation measure of the category score vector (144) meets the pre-determined requirement, e.g., the ratio between the highest category score and the second highest category score exceeds a pre-determined minimum ratio, the category score vector (144) is used to infer an interest level of the user (113a) without further adjusting the category score vector (144). Specifically, the inference controller (126) informs (e.g., via a command or by sending a message) the category score generator (125) that no further adjustment to the category score vector (144) is necessary.

However, if the score differentiation measure of the category score vector (144) fails to meet the pre-determined requirement, e.g., the ratio between the highest category score and the second highest category score is less than a pre-determined minimum ratio, the category score vector (144) is adjusted before being used to infer a interest level of the user (113a). Specifically, the inference controller (126) informs (e.g., via a command or by sending a message) the category score generator (125) that the category score vector (144) needs to be adjusted. Accordingly, the category score vector (144) is iteratively adjusted to generate the adjusted category score vector (150) until the inference controller (126) determines that the score differentiation measure of the adjusted category score vector (150) meets the pre-determined requirement. Accordingly, the adjusted category score vector (150) is used to infer an interest level of the user (113a).

Figure 2:
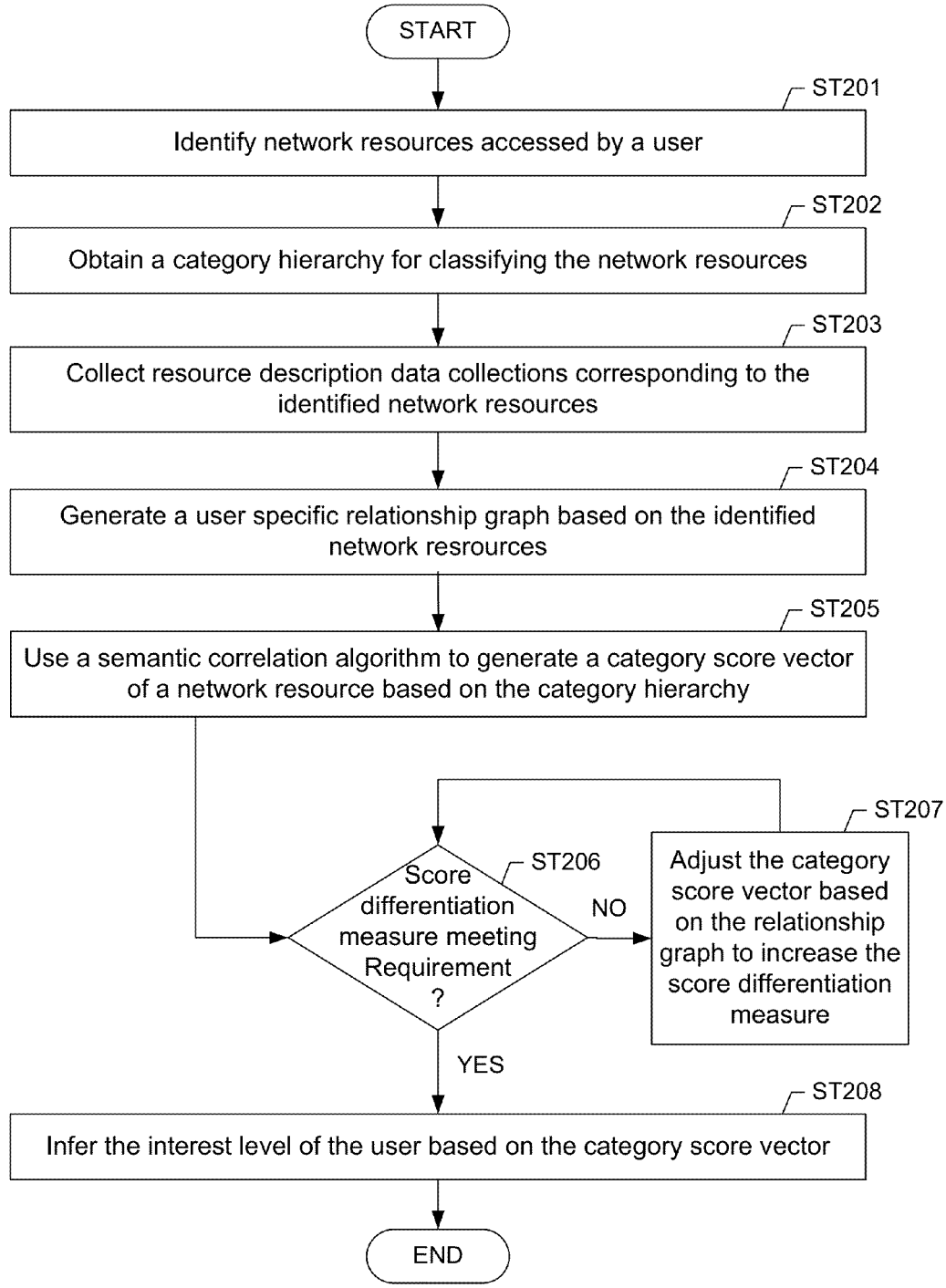
FIG. 2 shows a flowchart of a method according to aspects of the invention.

FIG. 2 depicts a flowchart of method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments of the invention, the methods depicted in FIG. 2 may be practiced using system (100) described with respect to FIGS. 1A and 1B above.

Initially in Step 201, network resources accessed by a user are identified. In one or more embodiments, the network resources accessed by the user are identified by analyzing a network trace associated with the user. In one or more embodiments, the network resources include a network application, a webpage, a network server, etc. In one or more embodiments, the user's network usage to access these network resources are monitored using an embedded system-level process monitoring software in a user device, such as a mobile device (e.g., a smartphone, tablet computer, notebook computer, etc.) or a personal computer (e.g., a desktop computer). In one or more embodiments, the user's network usage to access these network resources are monitored by capturing incoming and outgoing network traffic from the user device. Using either of the example methods, different levels of network resource usage statistics can be obtained. Examples of such statistics include a list of network resource identifiers (e.g., mobile app IDs, mobile app titles, URL, server domain names), network resource usage frequencies, time of day and duration of network resource usage along with the network resource identifiers, etc.

For the example of mobile app usage, let $A_{app}$ be a set of apps a user u uses. The network resources accessed by the user u are identified as app titles (or IDs) in $A_{app}$ along with their usage log. TABLE 1 shows network trace snippets where $A_{app}$ is identified.

TABLE 1

| | BEGIN_DATE | END_DATE | MOBILE_APP_ID |
|---|---|---|---|
| 1 | Jan. 1, 2013 00:01:25 | Jan. 1, 2013 00:01:25 | iHeartRadio 1.5.4 |
| 2 | Jan. 1, 2013 00:13:14 | Jan. 1, 2013 00:13:14 | eHarmony 1.3 |
| 3 | Jan. 1, 2013 01:21:58 | Jan. 1, 2013 01:41:52 | Pandora 1.4.0 |
| 4 | Jan. 1, 2013 02:07:31 | Jan. 1, 2013 02:34:27 | TwitterAndroid/2.0.1 |

For the example of web service usage, let $A_{web}$ be a set of web sites visited by the user u. The network resources accessed by the user u are identified as a list of web service Uniform Resource Locators (URLs), along with timing information. TABLE 2 shows network trace snippets where $A_{web}$ is identified.

TABLE 2

| | BEGIN_DATE | END_DATE | URL |
|---|---|---|---|
| 1 | Jan. 1, 2013 03:12:32 | Jan. 1, 04:01:22 | http://www.cnn.com/ |
| 2 | Jan. 1, 2013 03:14:29 | Jan. 1, 03:31:34 | https://www.facebook.com/BeautifulFitnessGirls |
| 3 | Jan. 1, 2013 04:42:56 | Jan. 1, 04:57:03 | https://www.bi-cycling.com/bikes-gear |

For the example of server access logs, let $A_{svr}$ be a set of network servers the user u accesses. The network resources accessed by the user u are identified as a list of server IP addresses along with their timing information. TABLE 3 shows network trace snippets where $A_{svr}$ is identified.

TABLE 3

| | BEGIN_DATE | END_DATE | IP ADDRESS |
|---|---|---|---|
| 1 | Jan. 1, 2013 00:13:14 | Jan. 1, 2013 00:32:44 | 69.63.176.13 |
| 2 | Jan. 1, 2013 01:23:14 | Jan. 1, 2013 01:23:55 | 69.63.176.15 |
| 3 | Jan. 1, 2013 01:23:57 | Jan. 1, 2013 00:30:11 | 69.63.176.13 |
| 4 | Jan. 1, 2013 00:51:58 | Jan. 1, 2013 01:41:52 | 208.85.40.20 |
| 5 | Jan. 1, 2013 01:56:10 | Jan. 1, 2013 02:12:47 | 208.85.40.20 |
| 6 | Jan. 1, 2013 01:56:10 | Jan. 1, 2013 02:12:47 | 204.15.20.121 |

In one or more embodiments, time stamps in the network trace are analyzed to extract access patterns in frequency, duration, and/or consistency (e.g., sporadic accesses to a network resource during a shorter time period versus periodic accesses over a longer time period) of user access to the network resources. In one or more embodiments, these access patterns are used to determine relative importance of each app, service, or server accessed by the user.

In Step 202, a hierarchy of categories (referred to as a category hierarchy) is obtained for classifying the network resources accessed by the user. In one or more embodiments, the category hierarchy is operator-defined, such as specified by an analyst who is an individual performing analysis of interests of the user. In one or more embodiments, the category hierarchy is obtained from a third party information source. In one or more embodiments, each category in the category hierarchy is assigned a text item describing the category. Based on the organization, the categories can be divided into flat categories and hierarchical categories. Flat categories are laid out in parallel such that no category supersedes another. Hierarchical categories, on the other hand, are organized in a tree-like structure in which each category may have parents and/or children category, creating one or more subcategory structure. A flat category organization is considered as a special case of a hierarchical category organization. In other words, the flat category organization is considered a single level category hierarchy. In one or more embodiments, each category in the category hierarchy is referred to as a node of the category hierarchy.

Examples of the category hierarchy are described in reference to FIGS. 3A-3C below. FIG. 3A shows a network protocol hierarchy (301) having text terms "streaming," "interactive," etc. assigned to the categories. FIG. 3B shows an online advertisement topic hierarchy (302) having text terms "arts & entertainment," "beauty and fitness," etc. assigned to the categories. FIG. 3C shows a web service directory hierarchy (303) having text terms "arts," "health," etc. assigned to the categories. In one or more embodiments, network resources are categorized using one or more of the network protocol hierarchy (301), the online advertisement topic hierarchy (302), and the web service directory hierarchy (303).

As shown in FIGS. 3A-3C, many nodes in all three example categorizations described above are typically assigned with text items having a single word or two words lacking detailed semantic descriptions. In one or more embodiments, the category hierarchy is expanded semantically before being used for classifying the network resources accessed by the user. In one or more embodiments, the text items assigned to categories in the category hierarchy are expanded using semantically equivalent words. FIG. 3I shows an original category hierarchy (390), which is a portion of the online advertisement topic hierarchy (302) shown in FIG. 3B, and an enhanced category hierarchy (395). Specifically, category enhancement (e.g., based on a thesaurus) is applied to a node (382) representing the category "arts & entertainment" in the original category hierarchy (390). The corresponding node (382a) in the enhanced category hierarchy (395) now are annotated with additional semantically equivalent words, such as "a cappella,' "acoustic," etc.

In one or more embodiments, all words in an expanded text term assigned to a category $\upsilon$ is represented by an expanded category term vector $L_\upsilon = \{\upsilon_1, \upsilon_2, \ldots, \upsilon_i, \alpha^p L_\upsilon^p, \alpha^s L_\upsilon^s, \alpha^c L_\upsilon^c\}$ with $\upsilon_1, \upsilon_2, \ldots, \upsilon_i$ being words in the text term initially assigned to the category $\upsilon$ and referred to as an initial category term vector of the category $\upsilon$. In addition, $L_\upsilon^p, L_\upsilon^s, L_\upsilon^c$ represent initial category term vectors of parents, siblings, and children of $\upsilon$, respectively, in the category hierarchy, $\alpha^p, \alpha^s, \alpha^c$ represent weighting factors ($0 \leq \alpha \leq 1$) of the parents, siblings, and children, respectively. In other words, in such embodiments, the expanded term vector of a category includes weighted text terms of immediate neighbors of the category in the category hierarchy. In one or more embodiments, the expanded term vector further includes weighted text terms of multiple-hop neighbors, such as 2-hop neighbors (e.g., grand parents, grand children), 3-hop neighbors, etc. Throughout this disclosure, the terms "category term vector" and "expanded category term vector" may be used interchangeably depending on the context.

Let weighting factors $\alpha^p, \alpha^s, \alpha^c = 0.5, 0.5, 0.3$, respectively, in the original category hierarchy (390) shown in FIG. 3I, the expanded term vector L for the node (383) is then {arts, entertainment, 0.5*beauty, 0.5*fitness, 0.3*movie, 0.3*music, 0.3*audio}. Each words (i.e., arts, entertainment, etc.) in this expanded term vector L will be compared against keywords describing a network resource (e.g., top K keywords from a description webpage of an app) to generate a mapping score. The overall mapping score between the network resource and the node (383) is then be determined by taking a linear combination of the mapping scores of all words using the weighting factors in the expanded term vector L.

In Step 203, resource description data collections corresponding to the identified network resources are collected. In one or more embodiments, the resource description data collections include information regarding the network resources that are identified from the network trace and additional information provided by third party sources. Examples of third party sources may include app markets for mobile apps, web service and website categorization websites (e.g., Alexa website) for web services and servers, and web search results obtained from a search engine using the network resource name (or a portion thereof) as the search keyword.

In one or more embodiments, the network resource accessed by a user is a network client application (e.g., a mobile application referred to as an app) referred to as the accessed network client application. In such embodiments, the identifier of the accessed network client application (e.g., app identifier or app title) is used to crawl (i.e., search) an online source of the accessed network client application (e.g., app market) to collect relevant descriptions of the accessed network client application. In one or more embodiments, the descriptions of the accessed network client application are collected from a description webpage from such online source. In particular, relevant portions of the description webpage are identified as target texts, from which keywords can be extracted for semantic based matching as described later.

Figure 3D:
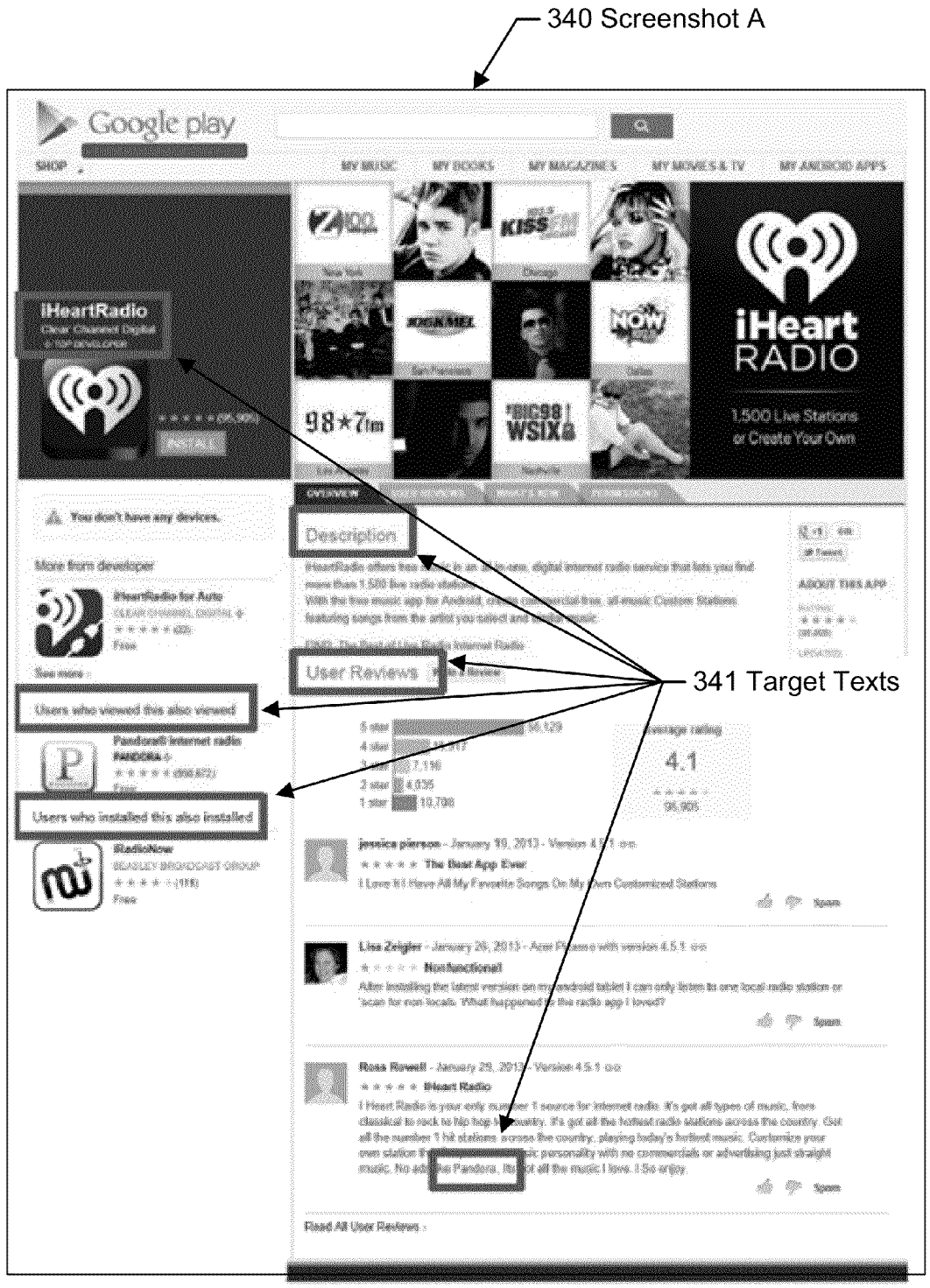

FIG. 3D shows a screenshot A (340) of the description webpage from the Google© play market for an accessed network client application iHeartRadio©. The screenshot A (340) includes identified target texts (341), such as app name, developer information, description, user reviews, co-clicked apps (i.e., identified by "users who viewed this also viewed"), co-installed apps (i.e., identified by "users who installed this also installed"), etc. While the format of information in the app description webpage varies by the online sources (e.g., app markets), general features shown in TABLE 4 are commonly available to be identified as the target texts.

TABLE 4

| Feature | Description |
| --- | --- |
| Title | App name used in app market. Many of the titles are informative on their functionalities. |
| Meta-information | Standardized app indenfier (e.g., numeric app ID, alphabetic app descriptor used in the app market) along with app developer, version number, locale information, etc. |
| App market category | Categorization given by app market. The category is assigned by app developers. The information provides a high level understanding on the nature of the app. |
| Description | App developers' description on the functionalities, utilities of the app. The free-form text range anywhere between 0 to 200 words. |
| User reviews | App users' voluntary evaluation on the app. Describes experience with the app and/or expression of appraisal or criticism on the app. |

Returning to the discussion of FIG. 2, in one or more embodiments, an identifier of a related network client application is obtained based on the description webpage of the accessed network client application and is used to retrieve a related description webpage. For example, the identifier of related network client application may be a hyperlink embedded in the description webpage of the accessed network client application as a reference or a review comments by other users. In one or more embodiments, the related description webpage is retrieved from an online source, which may be a different online source. In one or more embodiments, the resource description data collection of the accessed network client application includes information from the description webpage of the accessed network client application and information from the related description webpage of the related network client application. In one or more embodiments, contribution from the description webpage of the accessed network client application and contribution from the related description webpage of the related network client application to the resource description data collection of the accessed network client application are weighted based on weighting factors representing their relative importance. In one or more embodiments, the weighting factors are determined based on a user specific relationship graph representing relationships of at least the accessed network client application and the related network client application.

In one or more embodiments, the network resource accessed by a user is a webpage of a website, referred to as an accessed webpage of an accessed website. In such embodiment, webpage titles and contents of the accessed webpage and introduction pages (e.g., http://<domain name>/about.html) of the accessed website are crawled (i.e., searched) to collect relevant descriptions of the accessed webpage. In addition, identifier(s) (e.g., URL, webpage title, etc.) of the accessed webpage are used to look up additional descriptions from an Internet directory (e.g., http://www.alexa.com).

Figure 3E:
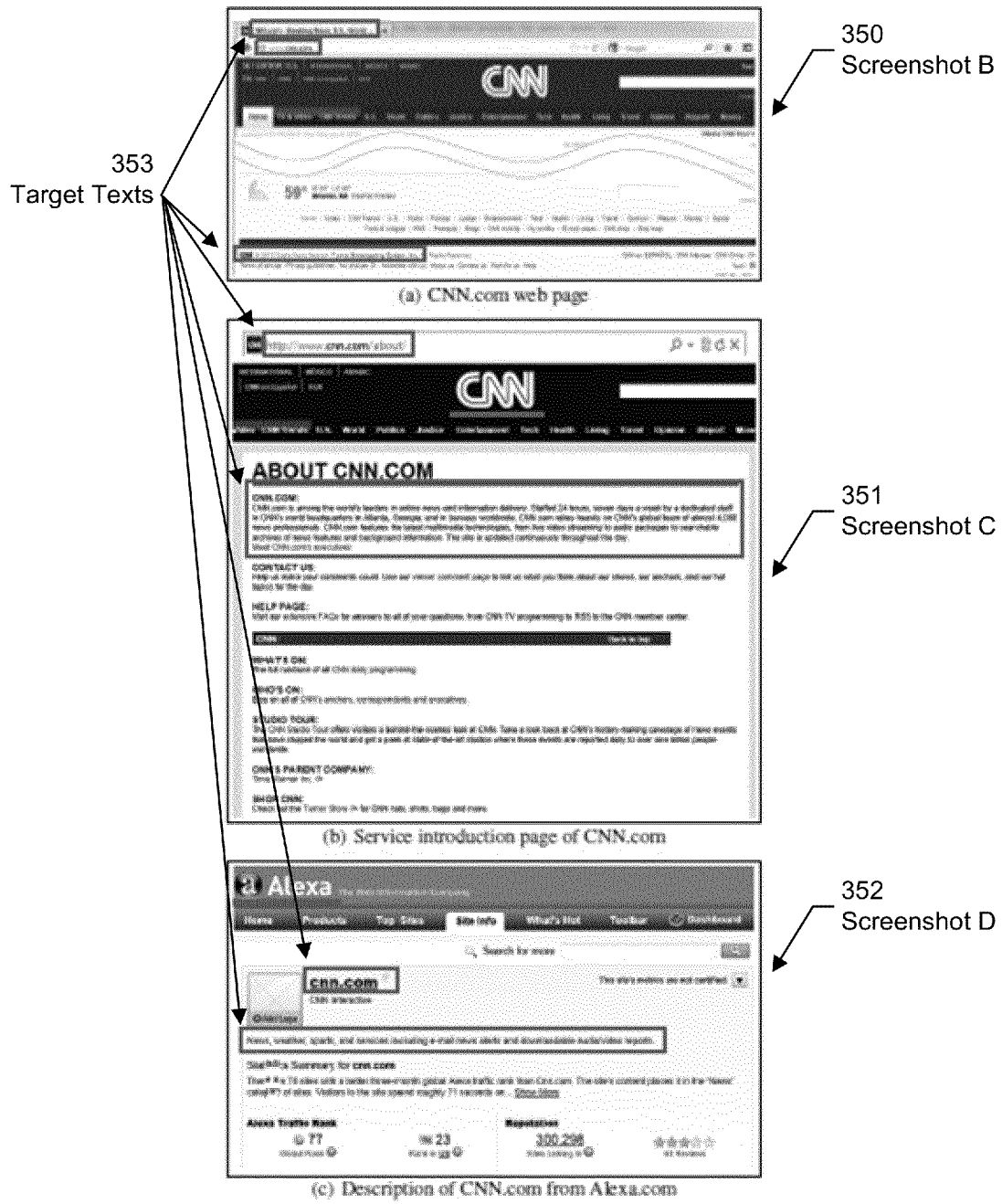

FIG. 3E shows a screenshot B (350) of an accessed webpage of the accessed CNN© website, a screenshot C (351) of the introduction pages of the accessed CNN© website, which can be accessed via a number of possible paths based on the accessed website URL concatenated with a pre-determined directory name (e.g., /about, /about.html, etc.), and a screenshot D (352) of the web service description from Internet directory services (e.g., Alexa.com). As shown in FIG. 3E, identified target texts (351) include generic description of webpage title, service company name, and other relevant information from the accessed webpage, the introduction pages of the accessed website, and Internet directory services.

In one or more embodiments, an identifier (e.g., URL) of a related webpage is obtained based on the accessed webpage/website and is used to retrieve a related webpage. For example, the identifier of the related webpage may be a hyperlink embedded in the accessed webpage/website as a reference or a review comments by other users. In one or more embodiments, the resource description data collection of the accessed webpage includes the aforementioned descriptions regarding the accessed webpage and similar descriptions regarding the related webpage. In one or more embodiments, contribution from the accessed webpage descriptions and contribution from the related webpage descriptions to the resource description data collection of the accessed webpage are weighted based on weighting factors representing their relative importance. In one or more embodiments, the weighting factors are determined based on a user specific relationship graph representing relationships of at least the accessed webpage and the related webpage. For example, the weighting factors may be determined based on the edge weights in the relationship graph.

In one or more embodiments, the network resource accessed by a user is a network server represented by a hostname, referred to as the accessed hostname. In such embodiment, the accessed hostname is used to query a domain name databases (e.g., whois website) for descriptions regarding the accessed network server, such as domain creation date, registrant name and address, administrator information, domain server names, etc. In addition, the accessed hostname is used as a search phrase for a pre-determined search engine to obtain relevant search results as descriptions of the accessed hostname.

Figure 3F:
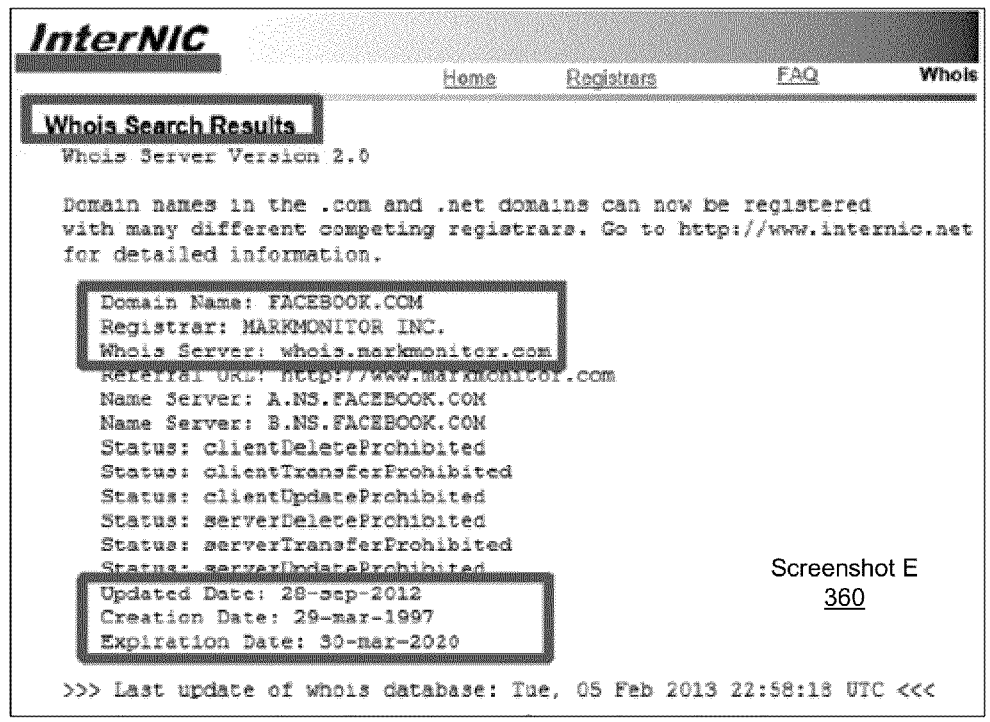
Figure 3G:
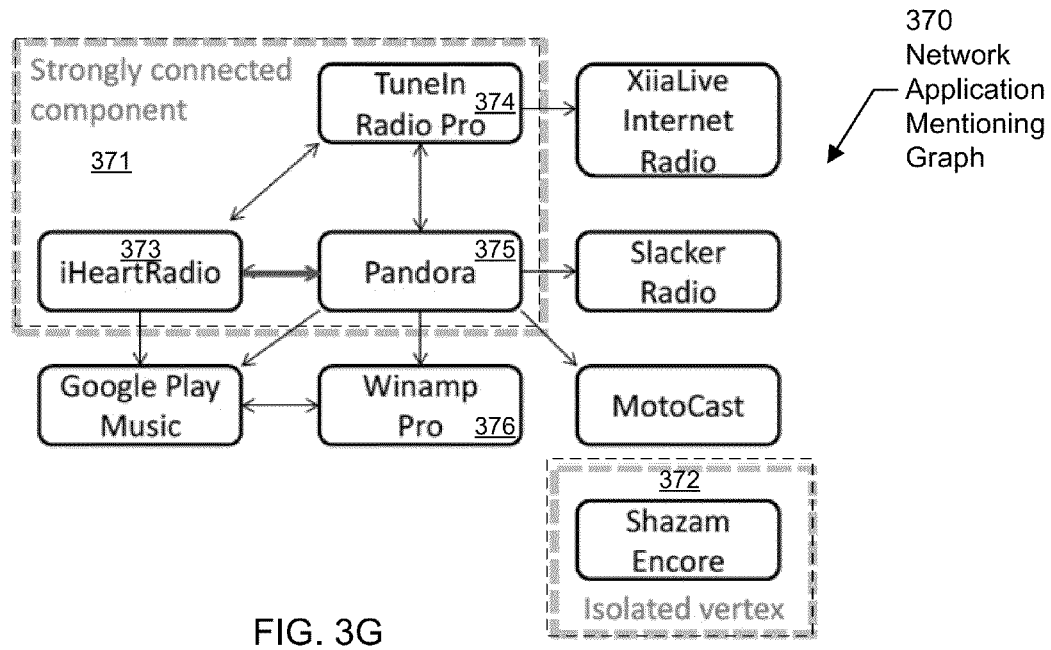
Figure 3H:
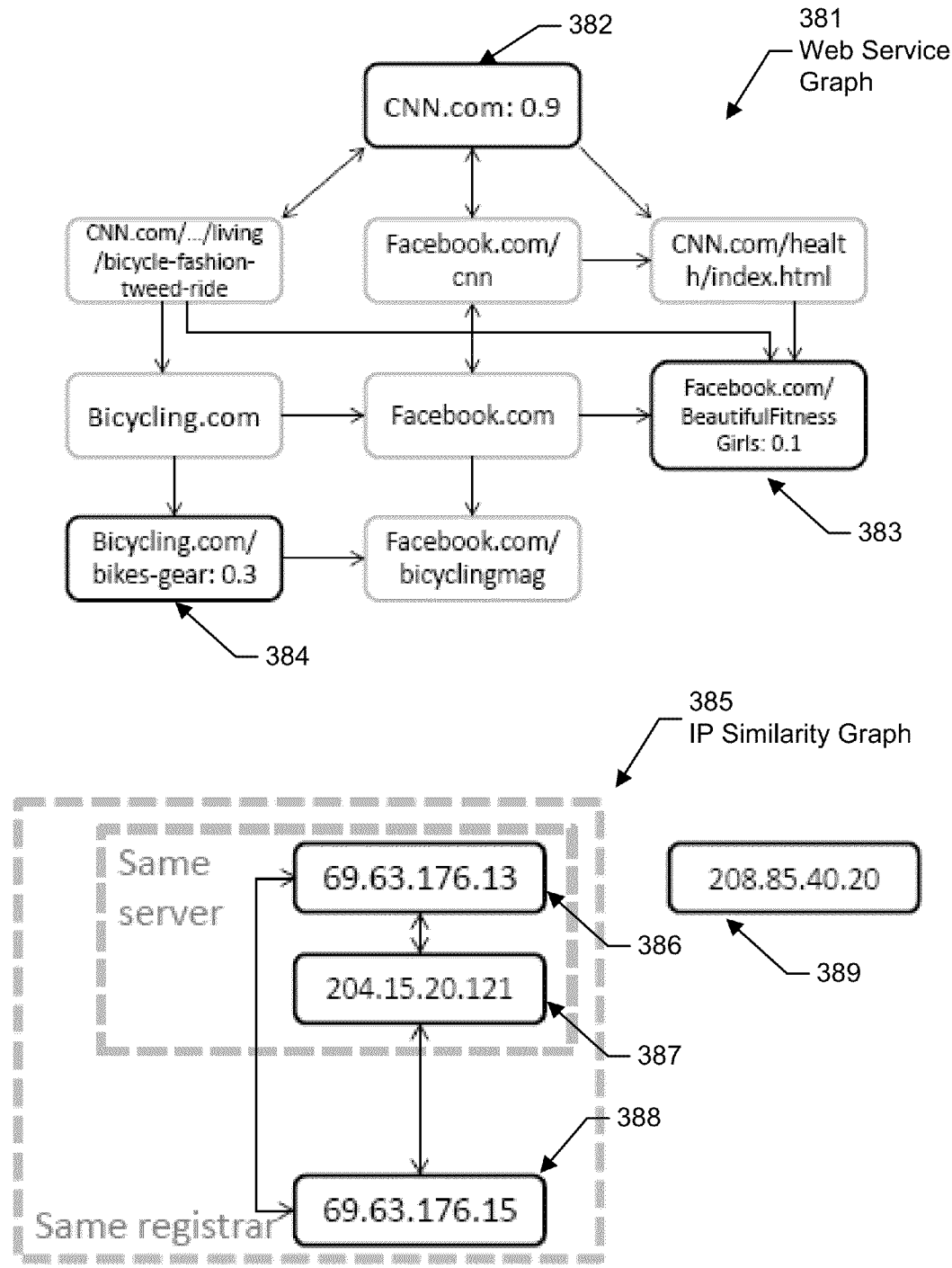
Figure 3I:
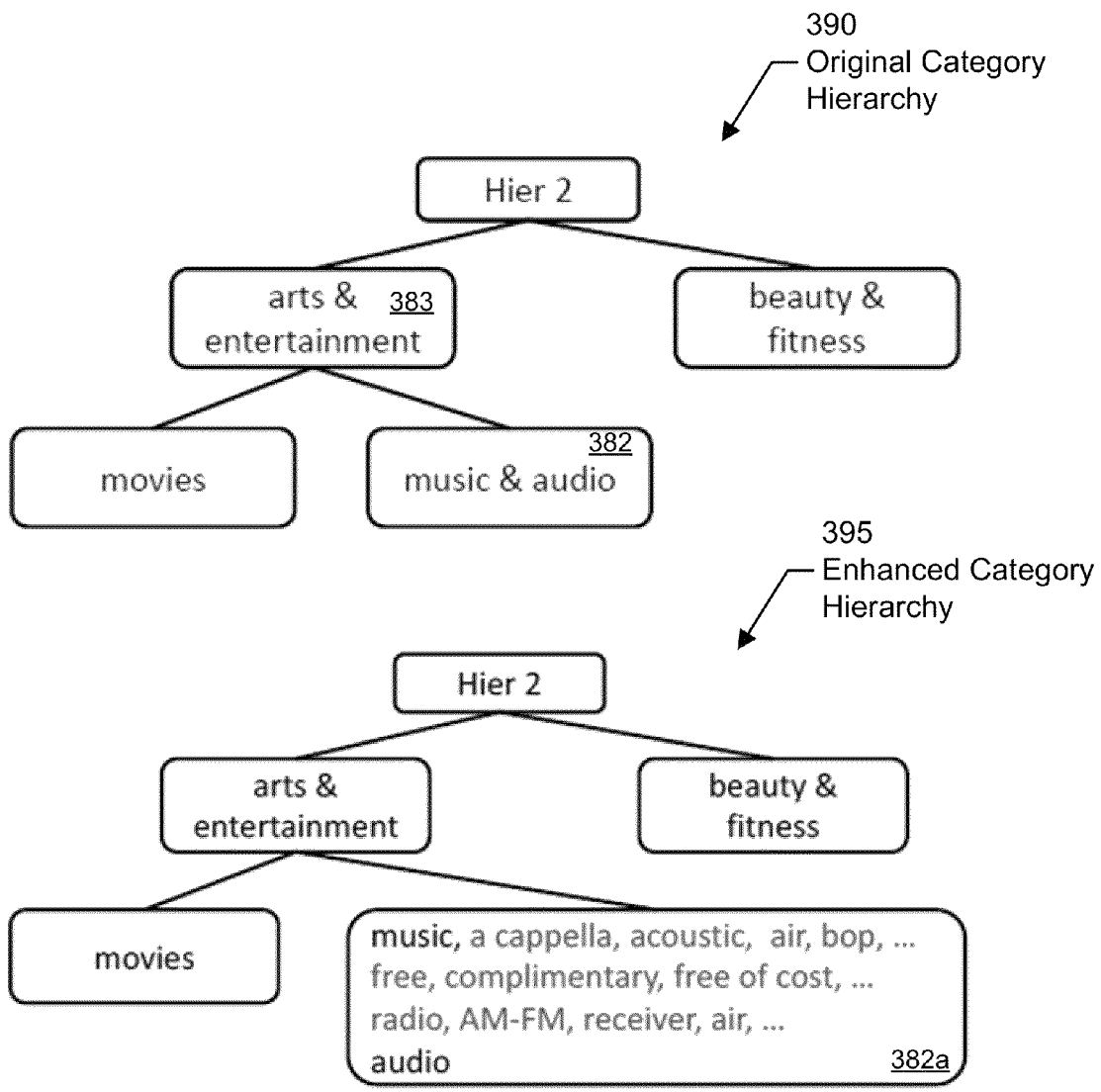

FIG. 3F shows a screenshot E (360) of displayed description of an example accessed network server (e.g., IP address URL{69.63.176.13}) from a domain name database whois, such as Fully Qualified Domain Name (FQDN), registrar, whois server, and dates of domain creation, last update, and expiration.

In one or more embodiments, a related hostname is obtained based on the accessed hostname and is used to retrieve a related webpage. In a possible embodiment the related hostname is the accessed hostname itself; in another embodiment the related hostname is a hostname in the domain name the accessed hostname belongs to. In one or more embodiments, contribution from the accessed hostname and contribution from the related hostname to the resource description data collection of the accessed hostname are weighted based on weighting factors representing their relative importance. In one or more embodiments, the weighting factors are determined based on a user specific relationship graph representing relationships of at least the accessed hostname and the related hostname. In Step 204, a user specific relationship graph is generated based on a pre-determined criterion. In one or more embodiments, the user specific relationship graph includes initial seeding nodes representing the user accessed network resources, which are used to expand the relationship graph to include additional nodes representing related network resources. In addition, the relationship graph further includes edges each representing a measure of cross-references between the resource description data collections of the network resources (i.e., nodes of the relationship graph) coupled by the edge.

As noted above, the relationship graph is used to expand and or adjust the resource description data collections of the accessed network resources. For example, in addition to the information directly extractable from app markets, web service description and categorization websites, and other sources, a number of latent information can be derived. In the case of mobile app markets, for example, user reviews tend to contain comments in relation to other apps available in the app markets. In one or more embodiments, the other apps being mentioned are likely to share some similarities with the reviewed app. Accordingly, the mentioning relationship of the apps in the reviews are captured in a directional mentioning graph having nodes representing apps and edges representing the mentioning relationship. For example, a review of an app a mentions another existing (and possibly well known) app a', a directional edge e going from a to a' is created in the mentioning graph. Similarly to the app mentioning graph, specific features of app markets such as co-click and co-install logs can be used to build relational graphs among apps that are viewed and installed together with the target app (i.e., the accessed network client application).

In the example screenshot A (340) shown in FIG. 3D, the target texts (341) includes a user review referring to a related network client application Pandora© that is related to the accessed network client application iHeartRadio©. FIG. 3G shows a network application mentioning graph (370) having, among others, nodes (373) and (375) representing accessed network client applications iHeartRadio© and Pandora© coupled via a directed edge representing relationship identified from this user review. As shown, the directed edge is a bi-directional edge indicating that the mentioning relationship between the nodes (373) and (375) is bi-directional. In other words, another user review in the description webpage of Pandora© also refers to iHeartRadio©. Further as shown in FIG. 3D, all directed edges coupling the nodes (373), (374), and (375) are bi-directional edges indicating that these are strongly related network client applications. Accordingly, the nodes (373), (374), and (375) are identified as strongly connected components to form a subgraph (371). Further as shown in FIG. 3D, the accessed network application represented by the node (372) is not coupled to any other nodes via any mentioning relationship. Accordingly, the node (372) is identified as an isolated vertex. Although not explicitly shown, in one or more embodiments, one or more directed edges in the network application mentioning graph (370) may be assigned a weighting factor representing a measure of mentioning relationship, e.g., based on how many user reviews mention the related network application. In one or more embodiments, some of the nodes in the network application mentioning graph (370) represent network client applications that are not accessed by the user but included based on mentioning relationships with other accessed network client applications.

In another example, relationships among webpages (e.g., the websites' hyperlink structures) are captured in a web service graph (or webgraph) having nodes representing webpages and directed edges representing incoming/outgoing hyperlinks among the webpages. A difference of webgraph from app mentioning graph is that, because the space of websites are much larger than that of the mobile apps, any two nodes in a webgraph may not necessarily mean that they are directly linked. Hence, the edges in the webgraph are considered indirect relationships (with one or more multi-hop paths) of the two nodes, using hyperlink based site-scores such as PageRank.

FIG. 3H shows a web service graph (381) having, among others, nodes (382), (383), and (384) representing three accessed webpages URL{CNN.com}, URL{facebook.com/beautifulFitnessGirls}, and URL{bicycling.com/bikes-gear}, respectively. In this particular example, the hyperlink structures are driven by PageRank, which is a random walk algorithm. Accordingly, the nodes (382), (383), and (384) are annotated with PageRank (i.e., shown as decimals following URLs) of the three corresponding accessed webpages. In one or more embodiments, some of the nodes in the web service graph (381) represent webpages that are not accessed by the user but included based on hyperlinks referenced by other accessed webpages.

In yet another example, relationships among network servers are captured in an IP similarity graph having nodes representing network servers and edges representing IP address-based similarities. In one or more embodiments, the IP address-based similarity assigned to an edge e is based on longest prefix matching on IP addresses of two network servers (i.e., nodes of the IP similarity graph) coupled by the edge. In the three example relationship graph (i.e., app mentioning graph, webgraph, and IP similarity graph), a proximity measure between any two nodes are determined based on the hop-distance and traversed edge weights between them. In one or more embodiments, a relationship strength measure between two network resources is determined based on the proximity measure between two corresponding nodes in the relationship graph.

FIG. 3H shows an IP similarity graph (385) having nodes representing accessed network servers identified using their IP addresses. The directed edges in the IP similarity graph (385) represent IP prefix similarities and existence of IP aliases among the IP addresses. From overlaps on their prefixes and association to identical domain names, two IP addresses (i.e., nodes (386) and (388)) beginning with URL{69.63.176} are determined to be in a single institution. From IP alias tests, two IP addresses (i.e., nodes (386) and (387)) of URL{69.63.176.13} and URL{204.15.20.121} are determined to represent two line-cards of a single machine. The solitary IP address (389) has no explicit relationship to other nodes (386, 387, 388) because its IP prefix has no overlaps with the rest of the addresses In Step 205, using a semantic correlation algorithm, a category score vector of the accessed network resource is generated by comparing the resource description data collection to the text item assigned to each category in the category hierarchy. In one or more embodiments, the category score vector includes a category score for each category in the category hierarchy, where the category score represents a semantic correlation measure between the resource description data collection and the text item assigned to a corresponding category in the category hierarchy.

In one or more embodiments, the semantic correlation algorithm includes applying lemmatization and stop-word removal to target texts in the resource description data collection. In one or more embodiments, the target texts include app title, description, user reviews, etc., such as the features shown in TABLE 4 above. In addition, document weighting schemes known to those skilled in the art, such as word counting or tf.idf, are used to select K (where K ranges from 1 to the total number of words) words from the resource description data collection (e.g., each of the features shown in TABLE 4 above) based on highest K weightings of all words in the resource description data collection. In particular, lemmatization is the process of grouping together the different inflected forms of a word so they can be analyzed as a single item. Further, tf-idf, term frequency-inverse document frequency, is a numerical statistic which reflects how important a word is to a document in a collection or corpus. The tf-idf value increases proportionally to the number of times a word appears in the document, but is offset by the frequency of the word in the corpus, which helps to control for the fact that some words are generally more common than others. In one or more embodiments, the selected K words (referred to as terms) form a network resource term vector denoted as T and used as a descriptor of the network resource.

In the example screenshot A (340) shown in FIG. 3D, top K keywords are extracted by applying key term extraction on the target texts (341). TABLE 5 shows a comparison before and after applying the key term extraction to the app description of network client application iHeartRadio© with K=10. In particular, the key term extraction includes applying the tf.idf document weighting algorithm on lemmatized text.

TABLE 5

| Original app description |
| --- |
| iHeartRadio offers free music in an all-in-one, digital internet radio servire that lets you find more than 1,500 live radio stations. With the free music app for Android, create commercial-free |
| . . . |
| Top 10 keywords (keyword:tt.idf score) |
| (music:0.31), (free:0.30), (radio:0.27), (station:0.27), (personalize:0.16) (commercial-free:0.14), (song:0.11), (artist:0.11), (live:0.09). |

Although the network resource term vectors provide a multitude of information regarding the network resource, they are not necessarily the exact terms contained in the category hierarchy. In one or more embodiments, the key term vectors are translated into semantically equivalent wordings. For example, a predefined database (DB) of word dictionary (e.g., the English dictionary, Wikipedia entries, thesaurus database, etc.) may be used to identify synonyms of the key terms. In one or more embodiments, a machine learning approach of supervision on the mapping between the key terms and categories are used. Classification is a process of matching a network resource term vector $T_a$ (of a network resource a) to one or more category term vector (or expanded term vector) $L_v$ (of a category v), each associated with a probability between 0 and 1. In one or more embodiments, the classification is performed by supervised learning where a human expert manually maps a subset of network resources to category nodes in the category hierarchy. From the network resource feature point of view, the supervision has an effect of improving the quality of categorization for feature-scarce network resources because if the labeling of feature-rich network resources are done correctly (by expert), the rest of feature-scarce network resources can also be correctly labeled based on their relations with the feature-rich network resources in the relationship graph. From the perspective of category nodes, the supervision enriches the semantics of the assigned text terms because the classification can use the key terms of the classified network resources in addition to the text terms initially assigned to the category nodes.

In one or more embodiment, mapping the accessed network resource to a particular category in a category hierarchy is based on the mapping score between the network resource and the particular category. In one or more embodiments, a kNN classifier is used to calculate a term similarity measure between the accessed network resource terms vector and the category term vector as the mapping score. In one or more embodiments, a Support Vector Machine (SVM) text classifier is used to calculate a fuzzy term similarity measure between the accessed network resource terms vector and the category term vector as the mapping score. In one or more embodiment, a logistic classifier is used as it optimizes the output decision to a binary form.

In one or more embodiment, mapping the accessed network resource to a particular category in a category hierarchy is further based on the mapping score between the accessed network resource and the parent node(s) of the particular category. In one or more embodiment, mapping the accessed network resource to a particular category in a category hierarchy is further based on the mapping score between the accessed network resource and the child node(s) of the particular category. In one or more embodiment, mapping the accessed network resource to a particular category in a category hierarchy is further based on the mapping score between the accessed network resource and the neighboring nodes up to a predetermined distance from the particular category.

In one or more embodiments, relationship graphs constructed on the latent app description information, such as network resource mentioning graph and co-click graph, are used to perform the classification as a relational learning problem known to those skilled in the art. For example, the relaxation labeling algorithm works by first using a text classifier (e.g., kNN or SVM classifier) to assign category probabilities (e.g., based on the aforementioned mapping score) to each network resource represented in the relationship graph. Then it considers each network resource iteratively and re-evaluates its category probabilities in relation to the latest estimates of the category probabilities of its (nearest) neighbors in the relationship graph. In addition to the relaxation labeling, link-based classification algorithms, such as loopy belief propagation and iterative classification can also be used. In one or more embodiments, results from multiple classifiers are combined to generate a single decision on accessed network resource classification using the voting and stacking method and/or the co-training method known to those skilled in the art.

Figure 3J:
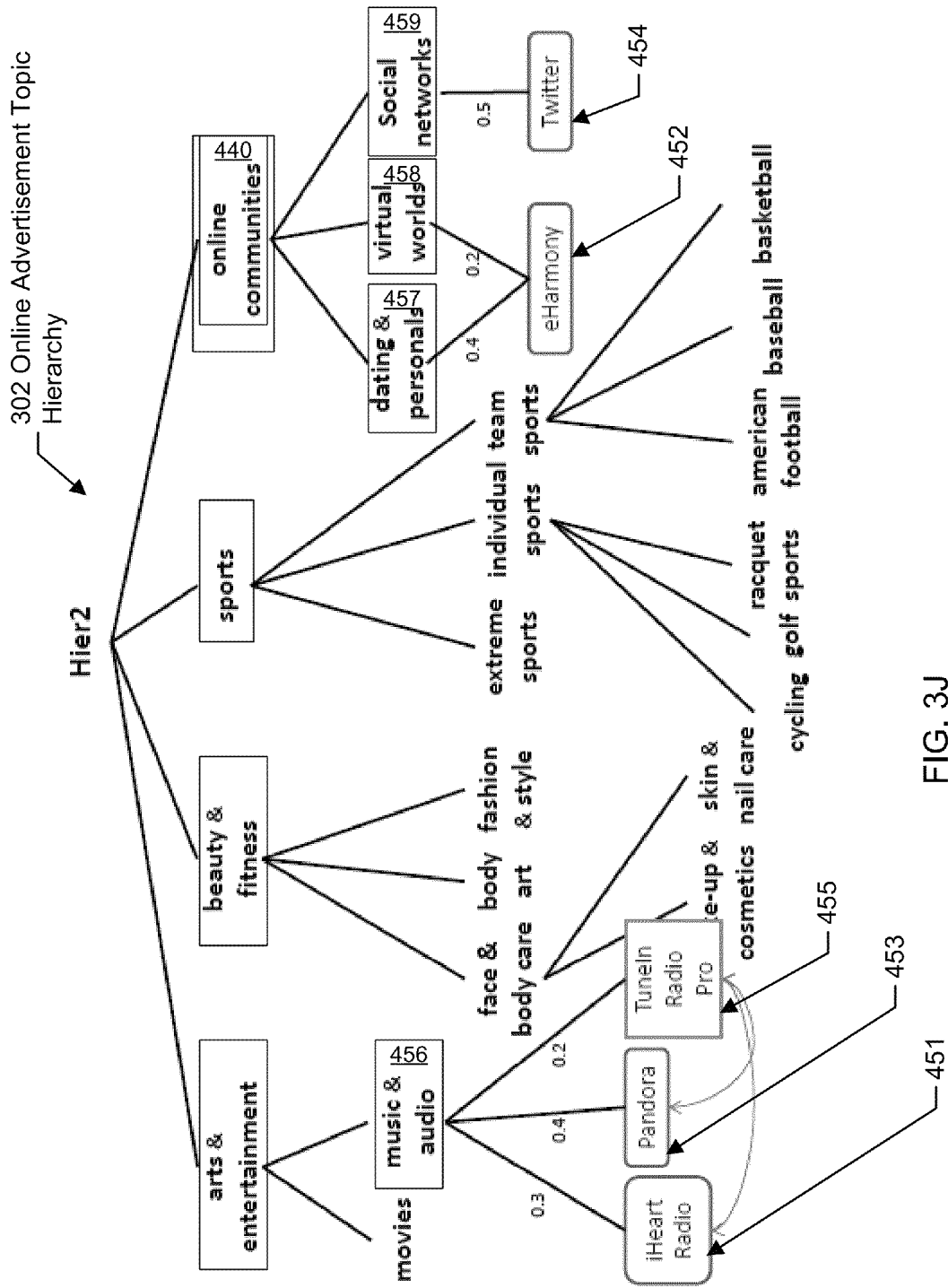

FIG. 3J shows the classification results of mapping four network resource term vectors to the online advertisement topic hierarchy (302) shown in FIG. 3B. As shown, four accessed network client applications (451)-(454) (i.e., iHeartRadio©, eHarmony©, Pandora©, and Twitter©) are categorized by matching their respective term vectors to the category term vectors of the online advertisement topic hierarchy (302). A SVM classifier is used to calculate term similarity measure for each (network application, category) pair as the mapping scores, such as 0.3, 0.4, 0.2, 0.5, etc.

In one or more embodiments, the mapping score or category probability of at least a portion (e.g., a subtree, a subgraph, the entire hierarchy, etc.) of the categories in the category hierarchy are aggregated to form a category score vector of the network resource. Accordingly, the category score vector is analyzed to determine a score differentiation measure representing variations among category scores in the category score vector. In one or more embodiments, the score differentiation measure is based on a ratio between the highest category score and the second highest category score in the category score vector. In other embodiments, other statistical measure may also be used to represent a level of differentiation among all category scores in the category score vector. For example, the category score vectors for the four accessed network client applications (451)-(454) (i.e., iHeartRadio©, eHarmony©, Pandora©, and Twitter©) shown in FIG. 3J have high score differentiation measure. Specifically, the mapping scores are insignificant (i.e., approximately zero and omitted from the FIG. 3J) for most categories except music & audio category (i.e., node (456)), dating & personals category (i.e., node (457)), virtual worlds category (i.e., node (458)), and social network category (i.e., node (459)).

In Step 206, a determination is made as to whether category scores in the category score vector are differentiated from each other. In one or more embodiments, the determination is made based on whether the category score differentiation measure meets a pre-determined requirement, such as exceeding a pre-determined threshold. If the determination is positive (or "YES"), i.e., the category score differentiation factor meets the pre-determined requirement, the method proceeds to Step 208. Otherwise, if the determination is negative (or 'NO"), i.e., the category score differentiation factor does not meet the pre-determined requirement, the method proceeds to Step 207, where one or more of a weighting factor for combining network resource descriptions, an edge weight in the relationship graph, a parameter of the semantic correlation algorithm, relaxation labeling, and/or link-based classification algorithms are adjusted to improve the category score differentiation factor.

In one or more embodiments, adjusting the category score vector includes selecting a related network resource based on the relationship graph where the measure of cross-references between the resource description data collection of the accessed network resource and the resource description data collection of the related network resource meets a pre-determined criterion. In one or more embodiments, the related network resource has not been used by the user and is therefore separate from any of the accessed network resources used to seed the relationship graph. In particular, the edges in the relationship graph further represents the measure of cross-references between the related network resource (and the resource description data record thereof) and the accessed network resources (and the resource description data collections thereof) used to seed the relationship graph.

Once the related network resource is selected, the semantic correlation algorithm is used again to generate a related category score vector of the related network resource. Accordingly, the category score vector of the accessed network resource and the related category score vector of the related network resource are combined based on a pre-determined formula to generate the adjusted category score vector. The method then returns to Step 206 where the determination is made again based on the adjusted category score vector.

Further as shown in FIG. 3J, the initially calculated category score vector for the accessed network client application (455) (i.e., TuneIn Radio Pro) has low score differentiation measure before any adjustment. However, it is categorized based on its strong connection with the other related network client applications (451) and (453) (i.e., iHeartRadio© and Pandora©). The resultant adjusted category score vector of accessed network client application (455) (i.e., TuneIn Radio Pro) has satisfactory score differentiation measure. Specifically, the mapping scores are insignificant (i.e., approximately zero and omitted from the FIG. 3J) for most categories except music & audio category (i.e., node (456)).

In Step 208, when the score differentiation measure (of the category score vector or the adjusted category score vector) is satisfactory based on the pre-determined requirement, the interest level of the user is inferred based at least on the category score vector. For example, when the highest score is at least twice as high as the second highest score, the category having the highest score is inferred as representing the user interest. In one or more embodiments, the category score vector is presented to an analyst user. In one or more embodiments, one or more categories with higher scores in the category score vector are presented to an analyst user. In one or more embodiments, a location based service is provided to the user based on the category score vector or the one or more categories with higher scores in the category score vector. For example, if it is inferred based on the category score vector (e.g., artisan coffee category having highest score in the category score vector) that the user is interested in artisan coffee in a particular location and/or during a particular time interval, a customized promotion advertisement and/or promotion coupon may be delivered to this user.

In one or more embodiments, inferred user interests are summarized by pruning the category hierarchy as well as by consolidating sub-categories in the category hierarchy. Summarization of user interests is performed for a number of reasons. For example, multi-label, soft classification results in each accessed network resource being mapped to multiple categories with varying probabilities. Single-label, hard classification, on the other hand, results in each accessed network resource being mapped to a single category with probability of 1. Secondly, the consideration of accessed network resource usage duration, time of day, and frequency from the network resource usage statistics results in different accessed network resource mapping to the categories. Because these considerations determine the significance (or weight) of each accessed network resource, by factoring in the weight, even a single-label, hard classification can results in a fractional probability assigned to the mapping of an accessed network resource to a category.

Figure 3K:
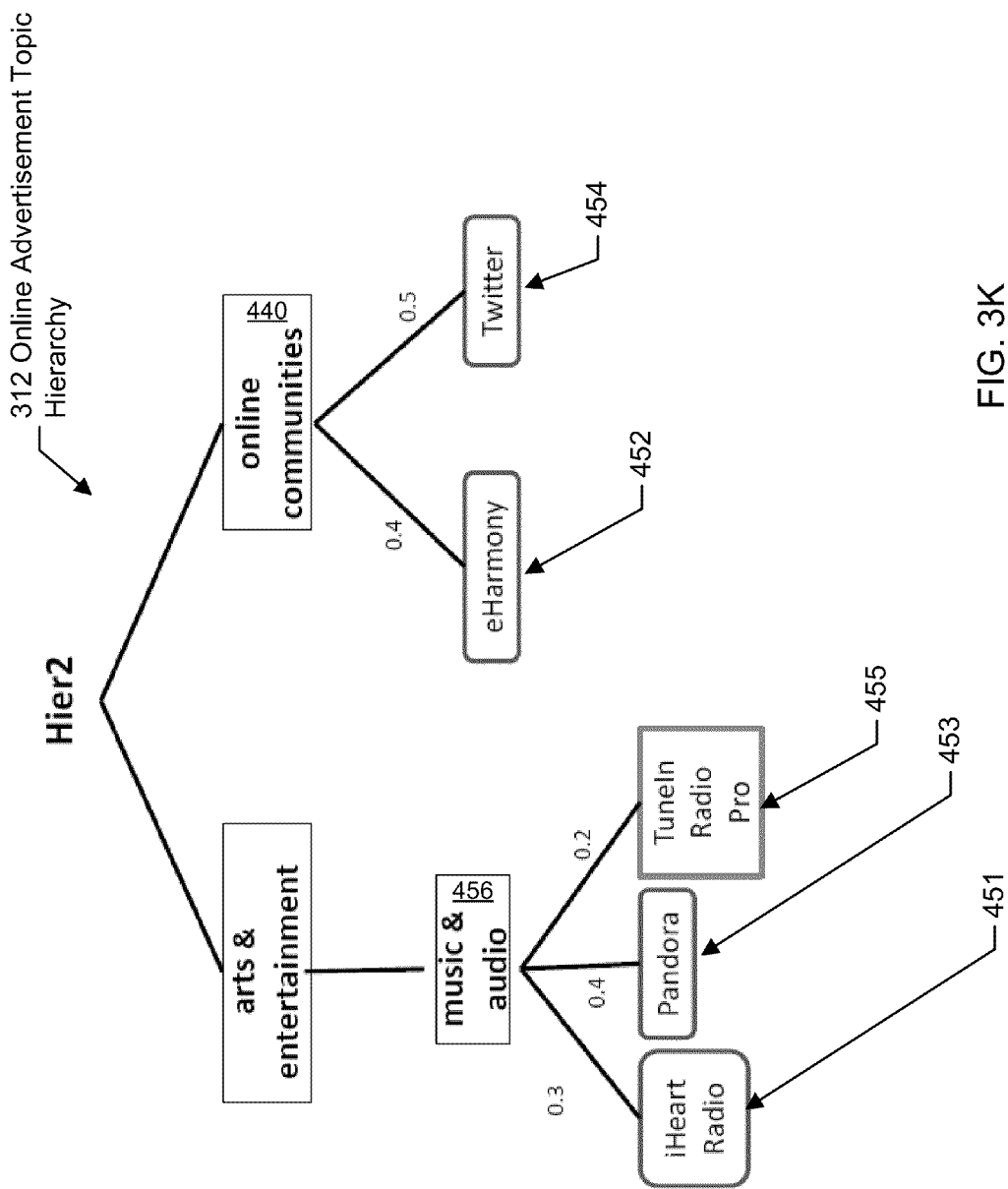

In one or more embodiments, two thresholds are used for summarization. First, to prune out insignificant mapping of an accessed network resource to categories, a minimum significance threshold on the mapping probability between accessed network resource and categories is used. Second, to provide variable levels of abstraction, when a majority of a category's child nodes (i.e., subcategories) are mapped to an accessed network resource, a maximum subcategory count threshold is used. By adjusting the minimum significance threshold and the maximum subcategory count threshold, different levels of category summarizations are generated suitable for diverse needs of the analyst user. FIG. 3K shows a summarized version of the classification results shown in FIG. 3J where all categories with insignificant (i.e., less than the minimum significance threshold) mapping scores are eliminated (i.e., pruned). Further, by setting a maximum subcategory count threshold to be less than three, three subcategories in dating & personals category (i.e., node (457)), virtual worlds category (i.e., node (458)), and social network category (i.e., node (459)) are collapsed. Application of the maximum subcategory count threshold is done by counting the number of subcategories of a node with significant mapping scores. For online communities category (i.e., the parent of nodes (457), (458), and (459)), the number of subcategory with significant scores are over the threshold. Hence the subcategories are collapsed into node (452) and (454) in FIG. 3K to be represented by their common parent the online communities category (i.e., node (440)). Accordingly, the user interests are inferred as music & audio category and online communities category based on the accessed network resources (451)-(455).

Figure 4:
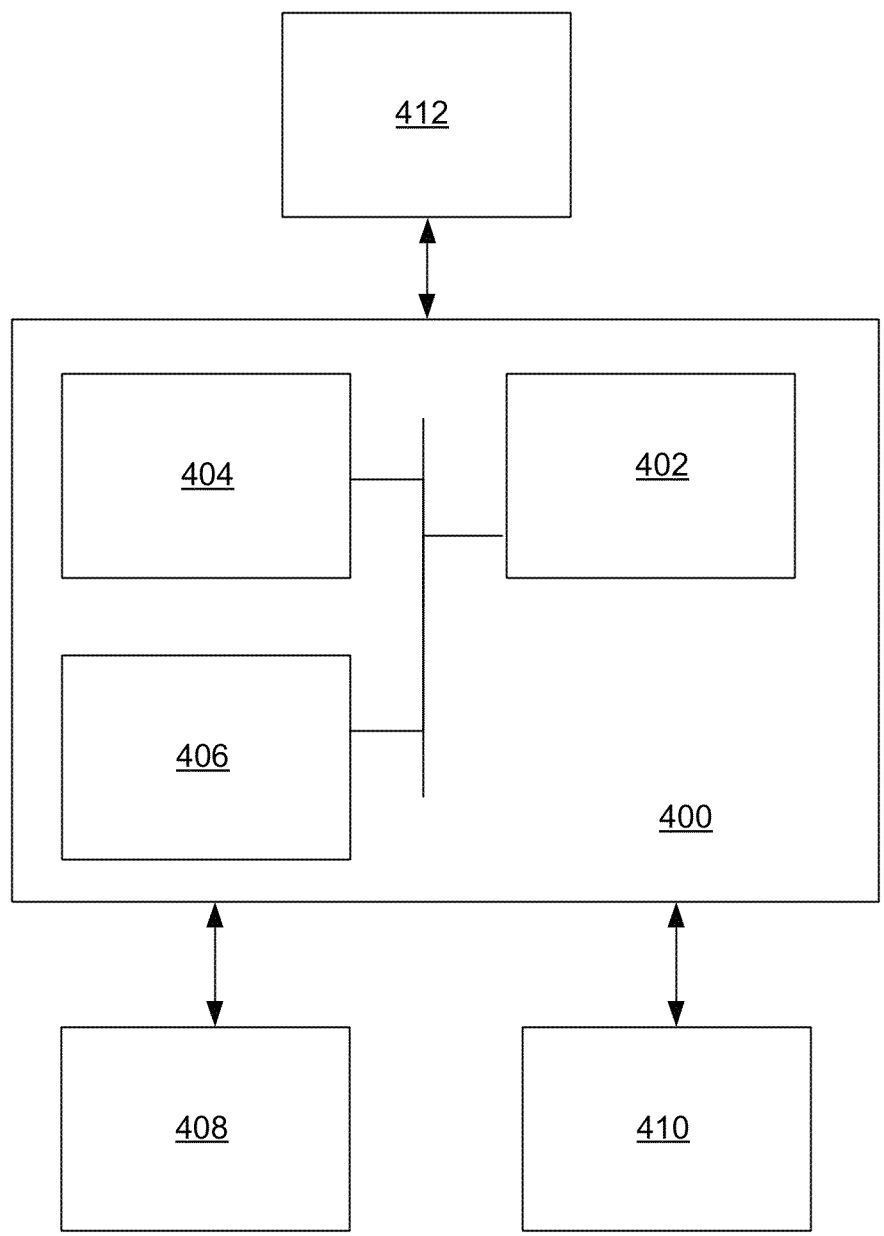
FIG. 4 shows a computer system according to aspects of the invention.

Embodiments of the invention may be implemented on virtually any type of computer regardless of the platform being used. For example, as shown in FIG. 4, a computer system (400) includes one or more processor(s) (402), associated memory (404) (e.g., random document access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor) for example to display various results such as the feature vectors, the principal components, the application space, the signatures, etc. The computer system (400) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., various modules of FIG. 1A) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for network resource classification, comprising:
- obtaining a hierarchy of categories for classifying a plurality of network resources, where each category is assigned a text item describing the category;
- obtaining a plurality of resource description data collections corresponding to the plurality of network resources, wherein the plurality of resource description data collections comprise a first resource description data collection corresponding to a first network resource of the plurality of network resources;
- generating, by a computer processor and using a semantic correlation algorithm, a first category score vector of the first network resource by comparing the first resource description data collection to the text item assigned to each category in the hierarchy of categories, wherein the first category score vector comprises a category score for each category in the hierarchy of categories, wherein the category score is determined based on at least a semantic correlation measure between the first resource description data collection and the text item assigned to a corresponding category,
  - wherein the plurality of network resources are classified based at least on the category score;
- analyzing a network trace associated with a user to identify the plurality of network resources accessed by the user;
- generating, based on a pre-determined criterion, a relationship graph comprising:
  - a plurality of nodes representing the plurality of network resources, and
  - a plurality of edges representing a measure of cross-references between the plurality of resource description data collections; and
- adjusting, based on the relationship graph, the first category score vector to generate a first adjusted category score vector using at least another category score vector of another network resource of the plurality of network resources.

2. The method of claim 1,
wherein the category score is determined further based on at least another semantic correlation measure between the first resource description data collection and another text item assigned to a neighbor category, wherein the neighbor category is within a pre-determined number of hops in the hierarchy of categories from the corresponding category assigned the text item.

3. The method of claim 1, wherein the first network resource comprises a first network client application, wherein obtaining the plurality of resource description data collections comprises:
- retrieving a first description webpage from an online source of the first network client application;
- obtaining an identifier of a second network client application based on the first description webpage; and
- retrieving a second description webpage from the online source of the second network client application,
- wherein the first resource description data collection comprises the first description webpage and the second description webpage.

4. The method of claim 1, wherein the first network resource comprises a first webpage, wherein obtaining the plurality of resource description data collections comprises:
- obtaining an URL of a second webpage based on the first webpage,
- wherein the first resource description data collection comprises the first webpage and the second webpage.

5. The method of claim 1, wherein the first network resource comprises a network hostname, wherein obtaining the plurality of resource description data collections comprises:
- obtaining a plurality of search results using the hostname as a search phrase of a pre-determined search engine,
- wherein the first resource description data collection comprises the plurality of search results.

6. The method of claim 1, further comprising:
- inferring an interest level of the user among the hierarchy of categories based on the first adjusted category score vector.

7. The method of claim 1, further comprising:
- analyzing the first category score vector to determine a first score differentiation measure representing variations among category scores in the first category score vector; and
- analyzing the first adjusted category score vector to determine a first adjusted score differentiation measure representing variations among adjusted category scores in the first adjusted category score vector;
- wherein adjusting the first category score vector is in response to the first score differentiation measure failing to meet a first pre-determined criterion, and
- wherein the interest level of the user is inferred in response to the first adjusted score differentiation measure meeting the first pre-determined criterion.

8. The method of claim 1, wherein adjusting the first category score vector comprises:
- selecting, based on the relationship graph and corresponding to a second network resource, a node from the plurality of nodes, wherein the measure of cross-references between the first resource description data collection and a second resource description data collection of the second network resource meets a second pre-determined criterion;
- generating, using the semantic correlation algorithm, a second category score vector of the second network resource; and
- aggregating, based on a pre-determined formula, the first category score vector and the second category score vector to generate the first adjusted category score vector.

9. The method of claim 1,
wherein the second network resource is separate from the plurality of network resources and has not been used by the user, and
wherein the plurality of edges further represents the measure of cross-references between the second resource description data record and the plurality of resource description data collections.

10. A system for network resource classification, comprising:
- a computer processor;
- an inference input module executing on the computer processor and configured to:
  - obtain a hierarchy of categories for classifying a plurality of network resources, where each category is assigned a text item describing the category;
  - obtain a plurality of resource description data collections corresponding to the plurality of network resources, wherein the plurality of resource description data collections comprise a first resource description data collection corresponding to a first network resource of the plurality of network resources;

analyze a network trace associated with a user to identify the plurality of network resources accessed by the user;

generate, based on a pre-determined criterion, a relationship graph comprising:
- a plurality of nodes representing the plurality of network resources,
- a plurality of edges representing a measure of cross-references between the plurality of resource description data collections;

a category score generator executing on the computer processor and configured to:
- generate, using a semantic correlation algorithm, a first category score vector of the first network resource by comparing the first resource description data collection to the text item assigned to each category in the hierarchy of categories, wherein the first category score vector comprises a category score for each category in the hierarchy of categories, wherein the category score is determined based on at least a semantic correlation measure between the first resource description data collection and the text item assigned to a corresponding category;
- adjust, based on the relationship graph, the first category score vector to generate the first adjusted category score vector using at least another category score vector of another network resource of the plurality of network resources; and a repository configured to store the plurality of resource description data collections and the relationship graph, wherein the plurality of network resources are classified based at least on the category score.

11. The system of claim 10,
wherein the category score is determined further based on at least another semantic correlation measure between the first resource description data collection and another text item assigned to a neighbor category, wherein the neighbor category is within a pre-determined number of hops in the hierarchy of categories from the corresponding category assigned the text item.

12. The system of claim 10, wherein the first network resource comprises a first network client application, wherein obtaining the plurality of resource description data collections comprises:
- retrieving a first description webpage from an online source of the first network client application;
- obtaining an identifier of a second network client application based on the first description webpage; and
- retrieving a second description webpage from the online source of the second network client application,
- wherein the first resource description data collection comprises the first description webpage and the second description webpage.

13. The system of claim 10, wherein the first network resource comprises a first webpage, wherein obtaining the plurality of resource description data collections comprises:
- obtaining an URL of a second webpage based on the first webpage,
- wherein the first resource description data collection comprises the first webpage and the second webpage.

14. The system of claim 10, wherein the first network resource comprises a network hostname, wherein obtaining the plurality of resource description data collections comprises:
- obtaining a plurality of search results using the hostname as a search phrase of a pre-determined search engine,
- wherein the first resource description data collection comprises the plurality of search results.

15. The system of claim 10,
wherein the inference input module is further configured to:
- infer an interest level of the user among the hierarchy of categories based on a first adjusted category score vector.

16. The system of claim 15, further comprises an inference controller configured to:
- analyze the first category score vector to determine a first score differentiation measure representing variations among category scores in the first category score vector; and
- analyze the first adjusted category score vector to determine a first adjusted score differentiation measure representing variations among adjusted category scores in the first adjusted category score vector;
- wherein adjusting the first category score vector is in response to the first score differentiation measure failing to meet a first pre-determined criterion, and
- wherein the interest level of the user is inferred in response to the first adjusted score differentiation measure meeting the first pre-determined criterion.

17. The system of claim 15, wherein adjusting the first category score vector comprises:
- selecting, based on the relationship graph and corresponding to a second network resource, a node from the plurality of nodes, wherein the measure of cross-references between the first resource description data collection and a second resource description data collection of the second network resource meets a second pre-determined criterion;
- generating, using the semantic correlation algorithm, a second category score vector of the second network resource; and
- aggregating, based on a pre-determined formula, the first category score vector and the second category score vector to generate the first adjusted category score vector.

18. The system of claim 15,
wherein the second network resource is separate from the plurality of network resources and has not been used by the user, and
wherein the plurality of edges further represents the measure of cross-references between the second resource description data record and the plurality of resource description data collections.

19. A non-transitory computer readable medium embodying instructions for network resource classification, the instructions when executed by a processor comprising functionality for:
- obtaining a hierarchy of categories for classifying a plurality of network resources, where each category is assigned a text item describing the category;
- obtaining a plurality of resource description data collections corresponding to the plurality of network resources, wherein the plurality of resource description data collections comprise a first resource description data collection corresponding to a first network resource of the plurality of network resources;
- generating, using a semantic correlation algorithm, a first category score vector of the first network resource by comparing the first resource description data collection to the text item assigned to each category in the hierarchy of categories, wherein the first category score vector comprises a category score for each category in the hierarchy of categories, wherein the category score is determined based on at least a semantic correlation measure between the first resource description data collection and the text item assigned to a corresponding category, wherein the plurality of network resources are classified based at least on the category score analyzing a network trace associated with a user to identify the plurality of network resources accessed by the user;

generating, based on a pre-determined criterion, a relationship graph comprising:
  a plurality of nodes representing the plurality of network resources, and
  a plurality of edges representing a measure of cross-references between the plurality of resource description data collections; and adjusting, based on the relationship graph, the first category score vector to generate a first adjusted category score vector using at least another category score vector of another network resource of the plurality of network resources.

20. The non-transitory computer readable medium of claim 19,
wherein the category score is determined further based on at least another semantic correlation measure between the first resource description data collection and another text item assigned to a neighbor category, wherein the neighbor category is within a pre-determined number of hops in the hierarchy of categories from the corresponding category assigned the text item.

21. The non-transitory computer readable medium of claim 19, wherein the first network resource comprises a first network client application, wherein obtaining the plurality of resource description data collections comprises:
  retrieving a first description webpage from an online source of the first network client application;
  obtaining an identifier of a second network client application based on the first description webpage; and
  retrieving a second description webpage from the online source of the second network client application,
  wherein the first resource description data collection comprises the first description webpage and the second description webpage.

22. The non-transitory computer readable medium of claim 19, wherein the first network resource comprises a first webpage, wherein obtaining the plurality of resource description data collections comprises:
  obtaining an URL of a second webpage based on the first webpage,
  wherein the first resource description data collection comprises the first webpage and the second webpage.

23. The non-transitory computer readable medium of claim 19, wherein the first network resource comprises a network hostname, wherein obtaining the plurality of resource description data collections comprises:
  obtaining a plurality of search results using the hostname as a search phrase of a pre-determined search engine,
  wherein the first resource description data collection comprises the plurality of search results.

24. The non-transitory computer readable medium of claim 19, wherein an interest level of the user among the hierarchy of categories is inferred based on the first adjusted category score vector.

25. The non-transitory computer readable medium of claim 24, the instructions when executed by a processor further comprising functionality for:
  analyzing the first category score vector to determine a first score differentiation measure representing variations among category scores in the first category score vector; and
  analyzing the first adjusted category score vector to determine a first adjusted score differentiation measure representing variations among adjusted category scores in the first adjusted category score vector;
  wherein adjusting the first category score vector is in response to the first score differentiation measure failing to meet a first pre-determined criterion, and
  wherein the interest level of the user is inferred in response to the first adjusted score differentiation measure meeting the first pre-determined criterion.

26. The non-transitory computer readable medium of claim 24, wherein adjusting the first category score vector comprises:
  selecting, based on the relationship graph and corresponding to a second network resource, a node from the plurality of nodes, wherein the measure of cross-references between the first resource description data collection and a second resource description data collection of the second network resource meets a second pre-determined criterion;
  generating, using the semantic correlation algorithm, a second category score vector of the second network resource; and
  aggregating, based on a pre-determined formula, the first category score vector and the second category score vector to generate the first adjusted category score vector.

27. The non-transitory computer readable medium of claim 24,
wherein the second network resource is separate from the plurality of network resources and has not been used by the user, and
wherein the plurality of edges further represents the measure of cross-references between the second resource description data record and the plurality of resource description data collections.

* * * * *